(12) United States Patent
Kuwabara et al.

(10) Patent No.: US 6,336,322 B1
(45) Date of Patent: Jan. 8, 2002

(54) METHOD OF CONTROLLING A PUMP TURBINE

(75) Inventors: Takao Kuwabara; Kei Katayama, both of Hitachi; Hiroto Nakagawa, Osaka; Haruki Hagiwara, Himeji, all of (JP)

(73) Assignees: Hitachi, Ltd., Tokyo; The Kansai Electric Power Co., Inc., Osaka, both of (JP)

( * ) Notice: Subject to any disclaimer, the term of this patent is extended or adjusted under 35 U.S.C. 154(b) by 0 days.

(21) Appl. No.: 09/707,843

(22) Filed: Nov. 8, 2000

(30) Foreign Application Priority Data

Nov. 9, 1999 (JP) ............................................. 11-318062
Jun. 30, 2000 (JP) ........................................ 2000-203097

(51) Int. Cl.⁷ ............................ F16D 31/00; F01B 25/00
(52) U.S. Cl. ............................... 60/325; 415/17; 415/38
(58) Field of Search ............................ 60/325; 415/17, 415/30, 38

(56) References Cited

U.S. PATENT DOCUMENTS

| | | | | |
|---|---|---|---|---|
| 3,572,959 A | * | 3/1971 | Shaughnessy | ................ 415/30 |
| 3,602,603 A | * | 8/1971 | Fukasu | ........................ 415/38 |
| 3,817,651 A | * | 6/1974 | Law et al. | ................ 415/30 X |
| 4,714,401 A | * | 12/1987 | Ikeda et al. | ................ 415/38 X |
| 5,234,315 A | * | 8/1993 | Ogihara et al. | ........... 415/30 X |

FOREIGN PATENT DOCUMENTS

| | | |
|---|---|---|
| JP | 53-143841 | 12/1978 |
| JP | 53-143842 | 12/1978 |

* cited by examiner

Primary Examiner—Hoang Nguyen
(74) Attorney, Agent, or Firm—Mattingly, Stanger & Malur, P.C.

(57) ABSTRACT

An object of the present invention is to provide a pump turbine capable of improving the stability of the governor by fully lessening the influences by the S-characteristics even when the running point of the pump turbine is in the S-characteristics region. For this purpose, in a pump turbine comprising a runner which is coupled with a generator motor, discharge control apparatus for controlling the quantity of water passing through the runner, and a governor for controlling said discharge control apparatus to keep the runner speed at a predetermined speed, the arithmetic apparatus of said governor is controlled to temporarily open said closing discharge control apparatus in the leading half of the speed decrease or earlier after the first speed increase upon a load rejection turns to a speed decrease upon a load rejection which abruptly shuts off power from the generator motor, so that the rotational speed of the runner goes down at much slower rate than the rate of increasing immediately after a load rejection.

47 Claims, 31 Drawing Sheets

METHOD OF CONTROLLING A PUMP TURBINE

FIELD OF THE INVENTION

The present invention relates to a method of controlling a pump turbine which switches a runner to work as a pump and as a turbine (by changing the rotational direction of the runner).

BACKGROUND OF THE INVENTION

Generally, the runner of a pump turbine, especially a high head pump turbine, is designed so as to realize a sufficient centrifugal pump action to obtain a high head during pump running.

However, this design adversely affects the turbine operation of the pump turbine. Especially when so-called S-characteristics appear as an example, it is considered to be difficult to avoid them perfectly.

It has been recognized that the S-characteristics are a bottleneck especially for high-head pump turbines in civil designing of upstream and downstream waterways, heights of installation, and so on. Therefore, there have been various proposals to control such S-characteristics. For example, Japanese Non-examined Patent Publication S53-143842 (1988) proposes a method of temporarily opening guide vanes of a pump turbine while the running point of the pump turbine is moving along a flowrate decreasing direction on the S characteristics after a load rejection and quickly closing the guide vanes when the running point of the pump turbine starts to move along a flowrate increasing direction on the S characteristics or when the flowrate becomes almost zero, as shown in the accompanying FIG. 1.

However, this proposal is designed to reduce the rotational speed (which temporarily increased after a load rejection) straight down to a predetermined rotational speed or its vicinity which is determined by a governor setting. For this purpose, the temporarily-opened guide vanes are closed as quickly as the sudden closing immediately after a load rejection instead of using the so-called buckling manner which changes the speed of closing the guide vanes from "limit" to "slow" when the opening of the guide vanes Y is smaller than Ya. This is very dangerous in case the S-characteristics controller is disabled. Further this proposal assumes that the temporarily-opened guide vanes start to close when the flowrate starts to increase (from the end of decreasing) or when the flowrate becomes almost zero. However, it is very difficult to detect a flow rate finely (at high resolution) in the transient status of the pump turbine. Even if a high-resolution flowrate is detected, it is very difficult to suddenly reverse the operation of the guide vanes and it can be easily inferred that the guide vanes are opened too much. Particularly, when you keep on operating the guide vanes even after the running point on the S characteristics ends moving along the flowrate decreasing direction and starts to move along the flowrate increasing direction, the influence by the S characteristics may be greater.

Judging from the above, it can be inferred that the method in accordance with Japanese Non-examined Patent Publication S53-143842 (1988) cannot assure the steady performance in case a plurality of pump turbines share an identical penstock or particularly when the flowrate of a pump turbine changes variously not only by its own running status but also by mutual hammering by other pump turbines.

SUMMARY OF THE INVENTION

In a normal loaded operation, the pump turbine unit is linked to a huge electric power system and stability of speed control is no longer the subject to be concerned. Therefore, the governor is set in favor of response speed rather than stability. After a load rejection, however, the pump turbine must continue a no-load operation singly. Therefore, the governor is required to be set so as to assure sufficient stability in speed control.

The S-characteristics region through which the running point of the pump turbine transitionally passes has not been considered to be a condition for setting the governor gains for a no-load operation. The governor gains have been enough to assure the stability only in the first region outside the S-characteristics region in which the Q1 value decreases as the N1 value increases, but have not been sufficient to assure the stability of operation in the S-characteristics region in which a positive feedback operation works.

Switching from a setting for a loaded operation (which is in favor of higher response of the arithmetic means in the governor) to a setting for a no-load operation (which is in favor of stability) is automatically made when the actual speed is well higher than a preset speed, when a circuit breaker opens, or such conditions of load rejection occurs.

An object of the present invention is, therefore, to provide a method of controlling a pump turbine to suppress influences by water hammering due to the S-characteristics or the like and other transient phenomena and to stabilize the operations of the pump turbine.

The present invention provides a method of controlling a pump turbine to solve the above problems.

In other words, the present invention obtains the expected result by designing and/or setting the arithmetic means of a governor so that a discharge controller being closed opens temporarily at least in the leading half of the first speed decrease curve after the speed increasing upon a full load rejection (which suddenly shuts off power generated by a generator motor) turns to decrease over a first peak while the pump turbine is running in the power generation mode, to stop the first speed decrease at a point which is higher than a rated rotational speed by one third of the difference between the first speed peak and the rated speed or more, and to turn the speed to increase from the point.

In this case, the present invention controls settings of the arithmetic means of the governor to be automatically switched in order to increase the response speed before the pump turbine after a load rejection is finally settled in a no-load operation. Further the present invention automatically switches the settings of the arithmetic means of the governor when the discharge controller closes to a predetermined opening value or below after a load rejection. Furthermore the present invention automatically switches the settings of the arithmetic means of the governor when the rotational speed decreases to a predetermined value or below after a load rejection. Additionally, the present invention automatically switches the settings of the governor so that the response speed of the governor may be in the order of normal loaded operation (fastest), no-load steady state operation, and earlier stage of the first speed decrease just after a load rejection (slowest).

This switching of the settings of the governor is made without a bump. The governor is a PID governor equipped with proportion, integration, and differentiation elements and only its integral gain is switched. The governor of the pump turbine in accordance with the present invention comprises a closing speed limiter which limits the closing speed of the discharge controller according to the opening of the discharge controller. The closing speed limiter limits the closing rate of the discharge controller to a second predetermined value or less which is comparatively higher while the opening of the discharge controller is larger than a first predetermined value and to a third predetermined value or below which is comparatively lower after the opening of the discharge controller goes below the first predetermined value. The arithmetic means of the governor is controlled or adjusted so as not to start the temporary opening of the closing discharge controller until the opening of the discharge controller goes below the first predetermined value after a load rejection.

The arithmetic means of the governor is also controlled or adjusted to start the temporary opening of the discharge controller after the rotational speed increasing to the first peak upon a load rejection turns to decrease over the peak and to continue the temporary opening until the speed reaches an inflection point at which the rotational speed curve turns from a convex curve to a concave curve. The arithmetic means of the governor is also controlled or adjusted to start the temporary opening of the discharge controller a little earlier than a time point at which the speed increase just after load rejection stops.

Further, the arithmetic means of the governor is also controlled or adjusted to start the temporary opening of the discharge controller a little earlier than a time point at which the speed increase just after load rejection stops and to continue the temporary opening until the speed reaches an inflection point at which the rotational speed curve turns from a convex curve to a concave curve. The arithmetic means of the governor is also controlled or adjusted to automatically change the gain settings of the governor from the response speed priority setting for a loaded operation to the stability priority setting (suitable for suppressing the adverse influence of S-characteristics) when the rotational speed exceeds a predetermined value higher than a rated rotational speed.

The present invention relates a pump turbine comprising a governor which monitors the rotational speed of the runner and controls the discharge controller to settle the speed of the runner steadily to a predetermined value. The arithmetic means of said governor is controlled and set (which is called S-characteristics setting) to temporarily open the closing discharge controller just before a first peak of the speed curve at which the speed increasing upon a full load rejection turns to decrease over the peak or in the leading half of the first speed decrease curve upon a full load rejection (which shuts off power generated by a generator motor) and to make a time period between the first peak and a speed value equal to the sum of the rated speed and a speed deviation according to the speed droop setting twice as much as or more than a time period between the start of the first speed rise and the first peak.

If in the Power Generation mode a load rejection or emergency stop accompanied by a speed rise occurs, the governor controls to quickly closes the discharge controller immediately after the speed starts to increase, but the governor controls to turn the closing discharge controller to open in the leading half of the speed rise, to continue opening the discharge controller approximately until the speed reaches the peak, to stop the discharge controller to open there, then to turn the discharge controller to close.

If in the Power Generation mode a load rejection or emergency stop accompanied by a speed rise occurs, the governor controls to quickly closes the discharge controller immediately after the speed starts to increase, but the governor controls to gradually decrease the closing rate of the discharge controller, turn the discharge controller to open smoothly in the leading half of the speed rise, to continue opening the discharge controller approximately until the speed reaches the peak, to gradually decrease the opening rate of the discharge controller, then to smoothly turn the discharge controller to close again.

If in the Power Generation mode a load rejection or emergency stop accompanied by a speed rise occurs, the governor controls to quickly closes the discharge controller immediately after the speed starts to increase, but the governor controls to turn the closing discharge controller to open in the leading half of the speed rise, to continue opening the discharge controller approximately until the speed reaches the peak, to stop the discharge controller to open there, then to turn the discharge controller to close.

Consequently, upon a full load rejection or almost full load rejection, the governor controls to make a time period between the occurrence of a load rejection and the reach of the speed to the first peak 1.5 times or above a time period between the first peak and the reach of the speed to the sum of the initial speed before the load rejection plus one third of the difference between the first peak and the initial speed before the load rejection.

If in the Power Generation mode a load rejection or emergency stop accompanied by a speed rise occurs, the governor controls to quickly close the discharge controller immediately after the speed starts to increase, but the governor controls to gradually reduce the closing rate of the discharge controller in the leading half of the speed rise, to smoothly turn the discharge controller to open, to continue opening the discharge controller approximately until the speed reaches the peak, to gradually reduce the opening rate of the discharge controller, and to smoothly turn the discharge controller to close. Consequently, upon a full load rejection or almost full load rejection, the governor controls to make a time period between the occurrence of a load rejection and the reach of the speed to the first peak 1.5 times or above a time period between the first peak and the reach of the speed to the sum of the initial speed before the load rejection plus one third of the difference between the first peak and the initial speed before the load rejection.

If in the Power Generation mode a load rejection or emergency stop accompanied by a speed rise occurs, the governor controls to quickly close the discharge controller immediately after the speed starts to increase, but the governor controls to turn the closing discharge controller to open in the leading half of the speed rise. Consequently, upon a full load rejection or almost full load rejection, the governor controls to make a time period between the occurrence of a load rejection and the reach of the speed to the first peak 1.5 times or above a time period between the first peak and the reach of the speed to the sum of the initial speed before the load rejection plus one third of the difference between the first peak and the initial speed before the load rejection.

If in the Power Generation mode a load rejection or emergency stop accompanied by a speed rise occurs, the governor controls to quickly close the discharge controller immediately after the speed starts to increase, but the governor controls to turn the closing discharge controller to open in the leading half of the speed rise, to continue opening the discharge controller until the speed reaches the peak, to stop opening the discharge controller, and to turn the discharge controller to close While the speed is increasing after a load rejection, the closing discharge controller can be turned to open by temporarily adjusting or switching the settings of the governor.

Its embodiment is to correction-control the governor so that the target speed of the runner may be temporarily higher immediately after a load rejection or an emergency stop command is made.

Or another embodiment is to correction-control the governor so that the target speed of the runner only in the transient status immediately after a load rejection may be substantially higher than the target value in the steady status.

Further, the present invention is characterized by correction-controlling the governor to substantially increase the target speed as the speed increases immediately after a load rejection gradually releasing (or decreasing) the correction control after the speed turns to go down, and releasing the correction-control substantially completely in the steady status.

The present invention is also characterized by changing from fast closing of the discharge controller smoothly to the above-mentioned opening so that the upstream penstock water pressure which increased during fast closing of the discharge controller immediately after a load rejection may be consequently retained at an approximately identical value until the speed reached the peak.

The governor is a PID governor equipped with proportion, integration, and differentiation elements. The operation to cause the closing discharge controller to turn to open while the speed is increasing after a load rejection is realized by temporarily reducing the gain of the proportion element, the gain of the integration element, or both.

Further, the operation to cause the closing discharge controller to turn to open while the speed is increasing after a load rejection is realized by automatically switching the settings of the governor so that the response speed of the governor may be in the order of normal loaded operation, no-load steady operation, and the first speed increasing stage just after a load rejection.

Further, the arithmetic means of the governor is automatically switched from a response priority setting for a loaded operation to a stability priority setting when the speed exceeds a predetermined value which is higher than the rated speed.

Furthermore, the setting of the arithmetic means of the governor is automatically switched from a setting for the above temporary opening operation to a setting for a no-load operation thereafter when the discharge controller is closed to a predetermined opening or below or when the speed goes below a predetermined value.

The governor controls to cause the discharge controller to temporarily open in the Power Generation mode and upon a load rejection which shuts off power generated by the generator motor.

In the Power Generation mode and upon a load rejection which shuts off power generated by the generator motor, the discharge controller is temporarily opened at least once before decreasing of the speed of the runner is accelerated too much after the peak.

A correction signal generator is also provided to supply correction values to the governor to correct the output signal of the governor. Upon a load rejection, the correction signal generator outputs a correction value to make the rate of decrease of the rotational speed of the runner much slower than the rate of increase of the rotational speed.

A correction signal generator is also provided to supply correction values to the governor to correct the output signal of the governor. The correction signal generator corrects signals of the governor to eliminate the second water hammering peak in the upstream side of the turbine which occurs immediately after the rotational speed of the runner starts to decrease after a load rejection which shuts off the generator motor from the power generation system.

A correction signal generator is also provided to supply correction values to the governor to correct the output signal of the governor. The correction signal generator corrects the output signals of the governor to eliminate the second water hammering peak in the upstream side of the turbine which occurs immediately after the rotational speed of the runner starts to decrease after a load rejection which shuts off the generator motor from the power generation system.

The discharge controller is temporarily opened by switching, changing, or modifying the transfer function of the arithmetic means of the governor after a load rejection or in the transient status after a load rejection.

Further, the present invention is provided with an opening limiter of the discharge controller which may be closed according to a predetermined program after a load rejection or in the transient status after a load rejection so that the opening of the discharge controller opened temporarily is limited and closing of the discharge controller thereafter is assured.

DETAILED DESCRIPTION OF PREFERRED EMBODIMENTS

Below will be explained some preferred embodiments of the present invention with reference to accompanying drawings.

Figure 1:
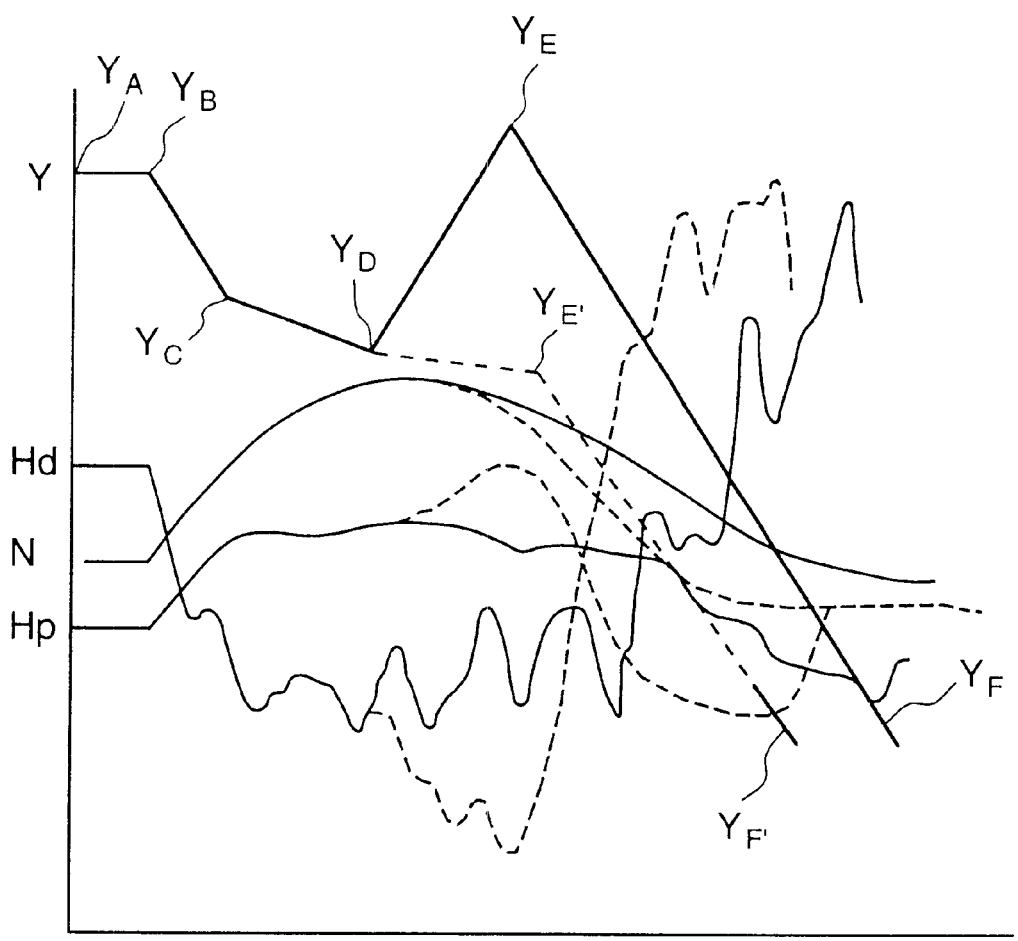
FIG. 1 shows a chart of conventional control.
Figure 2:
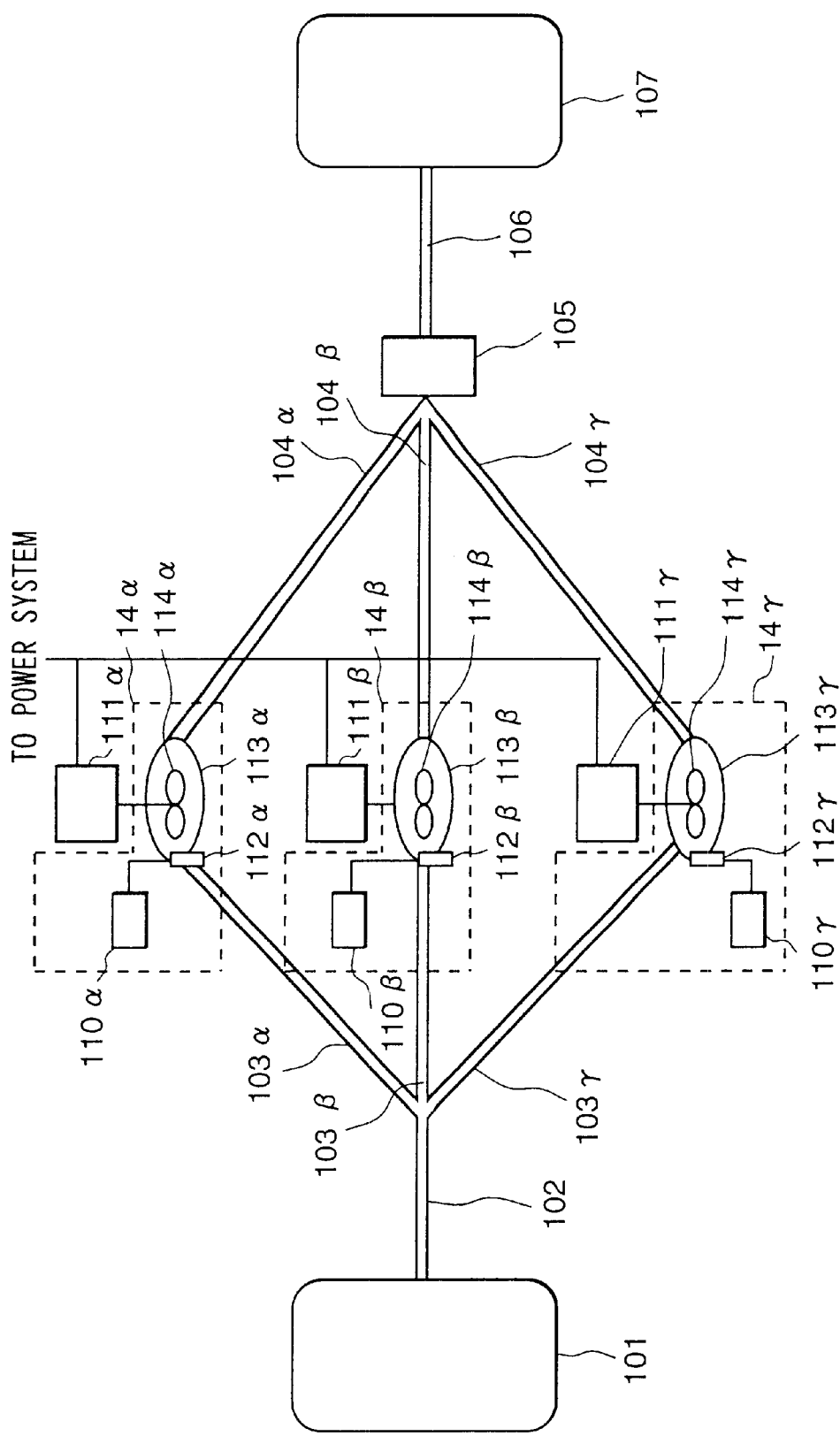
FIG. 2 is a block diagram of a power plant having 3 pumped storage units.

Referring to FIG. 2 will be explained the whole configuration of the pump turbine in accordance with the present invention. Water pooled in the upper reservoir 101 is guided into a penstock 102, then branched by penstocks 103α to 103γ respectively into pump turbines 14α to 14γ.

The quantities of water into runners 114α to 114γ of pump turbines 14α to 14γ from penstocks 103α to 103γ are controlled by guide valves 112α to 112γ which are respectively controlled by governors 110α to 110γ. The force of the running-down water rotates the runners 114α to 114γ and the power of the runners is transferred to power generators 111α to 111γ. Electric power generated by the generators 111α to 111γ is supplied to the power system.

Water passing through the pump turbines 14α to 14γ are guided by waterways 104α to 104γ into a surge tank 105 to dampen the shock. Then the water is guided into the lower reservoir 107 through a waterway 106. In case there is much surplus electric power left unused for example at night, the pump turbines 14α to 14γ are rotated reversely to pump up water from the lower reservoir to the upper reservoir. With this, the system is now ready for next power generation in preparation for urgent power requirements.

An example of using three such pump turbines in parallel will be explained below. The upstream side, downstream side, or both sides of the pump turbines having the S-characteristics are coupled as shown in FIG. 2.

S-characteristics

Figure 3:
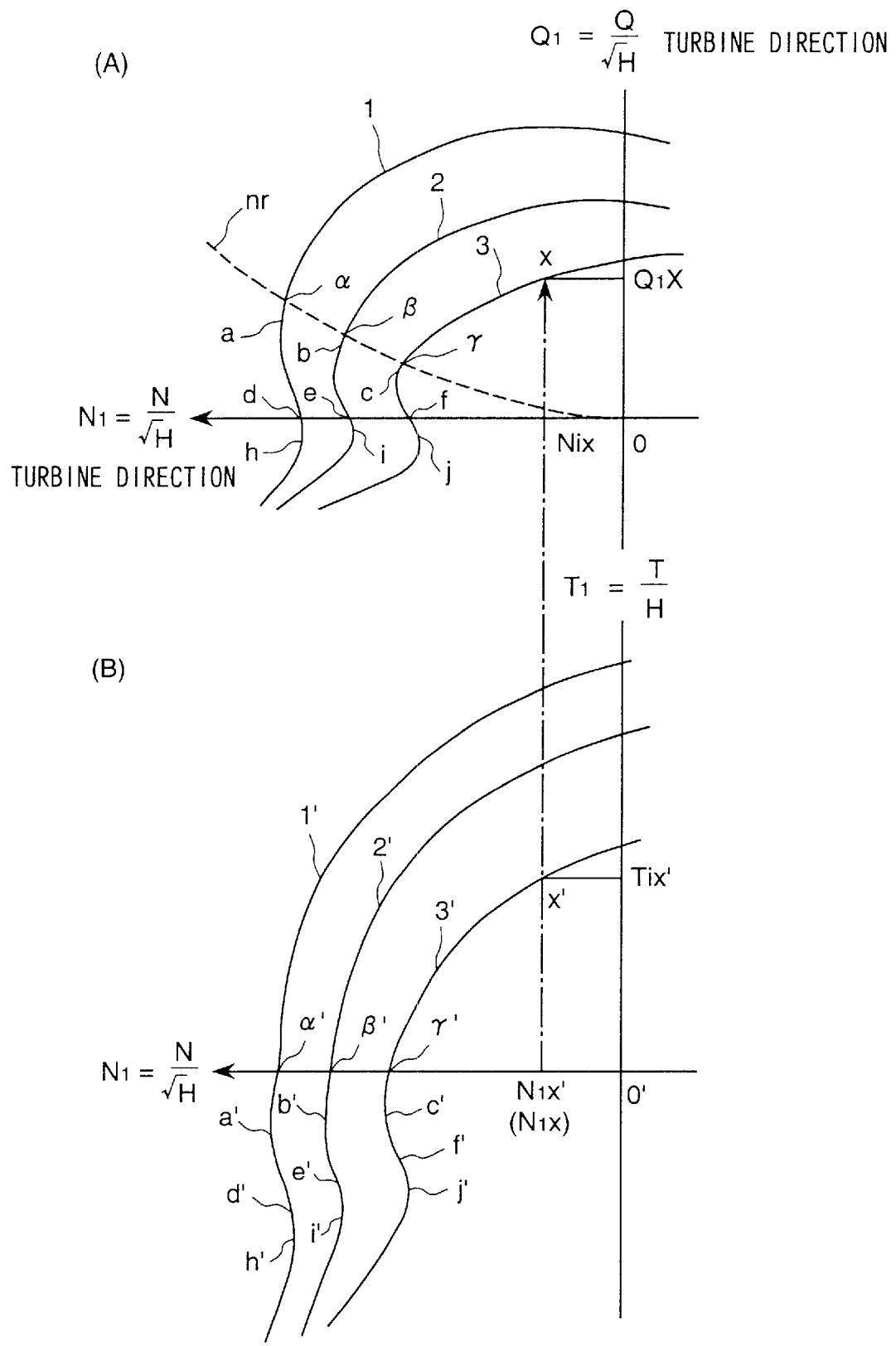
FIG. 3 shows two graphs explaining the S-characteristics.

Below will be explained S-characteristics specific to a pump turbine, referring to FIG. 3.

In general, the discharge characteristics of a pump turbine are expressed by a group of characteristic curves indicating relationships between the number of revolutions per unit head ($N1=N/\sqrt{H}$) and the discharge per unit head ($Q1=N/\sqrt{H}$) using the opening of the guide vane as a parameter. On the other hand, the torque characteristics of the pump turbine are expressed by a group of characteristic curves indicating the relationship between the number of revolutions per unit head ($N1=N/\sqrt{H}$) and the torque per unit head ($T1=T/H$) using the opening of the guide vane as a parameter. These two kinds of characteristic curves are generically termed perfect characteristics.

The discharge characteristic curve, in the turbine operation domain, has a first region where the Q1 value decreases as the N1 value increases and a second region where the Q1 value decreases as the N1 value decreases. For easier comprehension, the second region is referred to as an S-characteristics region in this specification.

Further, the pump turbine characteristics in the S-characteristics region is hereinafter termed as S-characteristics. For a turbine operation in the S-characteristics region, the torque per unit head (T1) also decreases as the number of revolutions per unit head (N1) decreases.

The normal pump turbine operation in the turbine mode is performed in the first region. However, when the number of revolutions per unit head (N1) suddenly increases upon a load rejection, the pump turbine operation is in the S-characteristics region.

When the pump turbine operation starts at a point in the S-characteristics region, the running point of the pump turbine moves along the curve in the S-characteristics region from one end to another end. Initially, the discharge per unit head (Q1) and the number of revolutions per unit head (N1) decrease. Then the running point of the pump turbine swings back (like a pendulum) along the curve in the S-characteristics region. Naturally, both the discharge per unit head (Q1) and the number of revolutions per unit head (N1) increase. This reciprocating motion in the S-characteristics region infinitely continues unless the guide vanes are closed. At the same time, the torque per unit head (T1) also swings between decreasing and increasing. This swinging phenomenon is striking in the region where the Q1 value (or T1 value) increases as the N1 value increases. However, pump turbines whose characteristics Q1 to N1 is upright also show this phenomenon. This is because the speed control system by the governor becomes less stable as the gradient $\delta Q1/\delta N1$ or $\delta T1/\delta N1$ becomes great (steep). The S-characteristics contains not only a region where the Q1 value (or T1 value) increases as the N1 value increases but also a region where the gradient $\delta Q1/\delta N1$ (or $\delta T1/\delta N1$) is great (steep) even when the gradient $\delta Q1/\delta N1$ (or $\delta T1/\delta N1$) is less than 0. Therefore, it is needless to say that the present invention is also applicable to pump turbines having such steep gradients.

The characteristics of a pump turbine having S-characteristics in the turbine operation region are shown in FIG. 3(A) and FIG. 3(B). The pump turbine characteristics of FIG. 3(A) shows a relationship between the number of revolutions per unit head (N1) and the discharge per unit head (Q1) using a guide vane opening as a parameter. Similarly, the pump turbine characteristics of FIG. 3(B) shows a relationship between the number of revolutions per unit head (N1) and the torque per unit head (T1) using a guide vane opening as a parameter.

In the above description, symbols N, Q, H, and T respectively indicate the number of revolutions, discharge, effective head, and torque of the pump turbine.

The characteristic curves 1 and 1' are obtained when the opening of the guide vanes are comparatively great and predetermined. The characteristic curves 2 and 2' are obtained when the opening of the guide vanes are smaller. The characteristic curves 3 and 3' are obtained when the opening of the guide vanes are much smaller.

In the line segment a-d-h of the characteristic curve 1, the Q1 value decreases as the N1 value decreases. This line segment is called the S-characteristics region in this specification. Similarly, the line segment b-e-i is called the S-characteristics region of the characteristic curve 2 and the line segment c-f-j is called the S-characteristics region of the characteristic curve 3. As seen at a glance, the segment a-d-h of the characteristic curve 1 is longer than the line segment b-e-i and the line segment b-e-i is longer than the line segment c-f-j. This means that the line segment of the S-characteristics becomes shorter as the opening of the guide vanes becomes smaller.

In FIG. 3(B) as well as FIG. 3(A), line segments a'-d'-h', b'-e'-i', and c'-f'-j' are S-characteristics regions of the characteristic curves 1', 2', and 3'.

FIG. 3(B) is closely related to FIG. 3(A). For example, point x on curve 3 in FIG. 3(A) which satisfies Q1=Q1x and N1=N1x corresponds to point x' on curve 3' in FIG. 3(B). Point x' satisfies T1=T1x' and N1=N1x' (=N1x). Similarly, points a, b, c, d, e, f, h, i, and j in FIG. 3(A) correspond to points a', b', c', d', e', f', h', i, and j' in FIG. 3(B) respectively.

Curve nr is a no-load discharge curve. Intersections α, β, and γ of the curve nr and the curves 1, 2, and 3 correspond to intersections α', β', and γ' of the straight line T1=0 and the curves 1', 2', and 3'.

Figure 4:
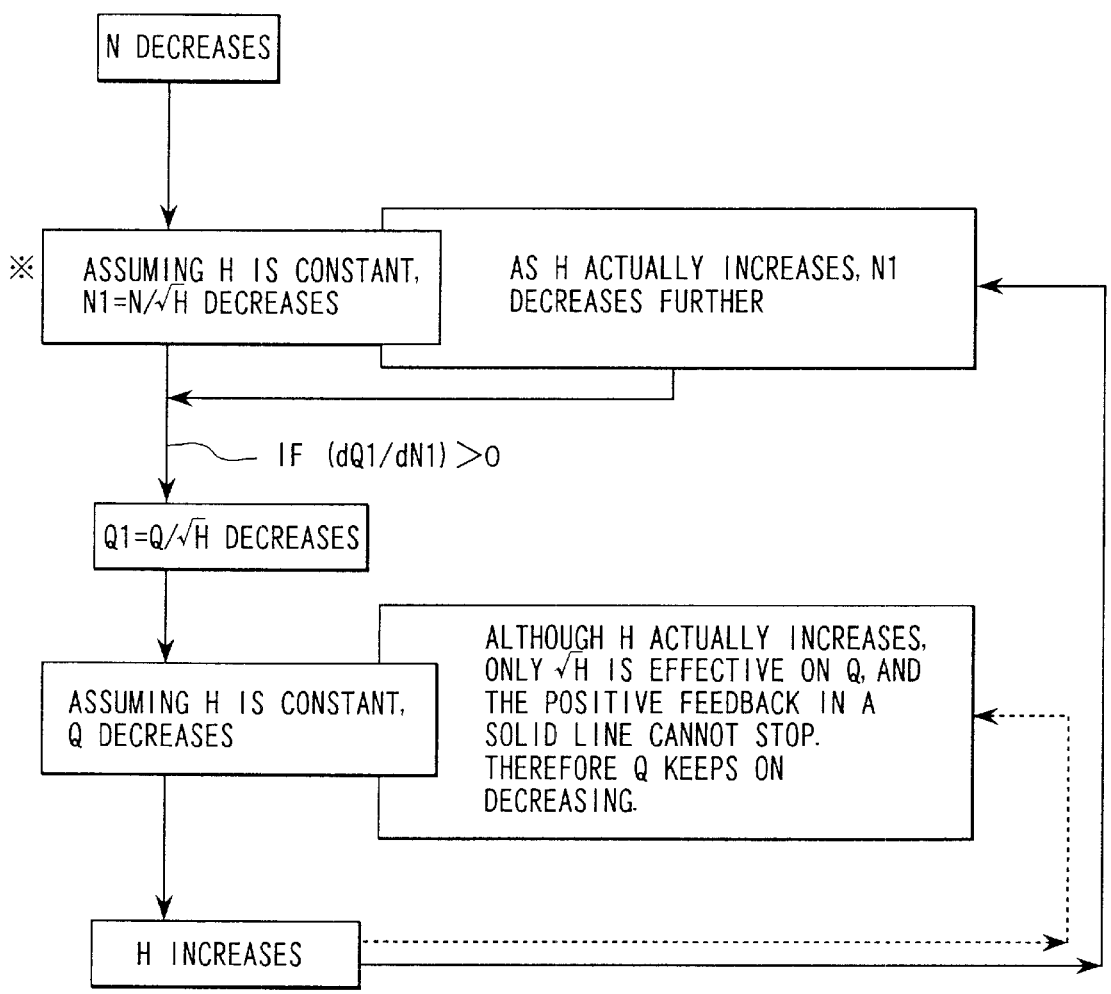
FIG. 4 is a flow chart of the swing-back action affected by the S-characteristics.

The turbine operation (for power generation) of a pump turbine will be explained below referring to the characteristic curves 1 and 1'. As mentioned above, the characteristics corresponding the characteristic curve 1 to the characteristic curve 1' are obtained when the opening of the guide vanes is comparatively great. Usually, the turbine operation of a pump turbine is conducted above the characteristic curve 1, that is, on a curve above the line segment a-d-h of the S characteristic region. However, for example, when a load upon the pump turbine is suddenly lost, the number of revolutions (N) of the pump turbine increases drastically, the N1 value also increases drastically. The pump turbine starts running in the S-characteristics region. When the running point enters the S-characteristics region, the number of revolutions (N) of the pump turbine decreases and the N1 value and the Q1 value decrease. Consequently, the pump discharge (Q) decreases. FIG. 4 explains this in detail. Contrarily, the head (the H value) between the entrance and the exit of the pump turbine increases as the discharge Q decreases. Once the N1 value decreases, the discharge Q decreases. The decrease of the discharge Q causes the increase of the effective head H of the pump turbine. Further the increase of the effective head H causes the decrease of N1 and the decrease of N1 causes the decrease of Q1. In this way, once the pump turbine starts running in the S-characteristics region, Q1 and N1 decrease with increasing speed from point a to point d (to reduce the Q1 value in the S-characteristics region). It is needless to say that the progress of decrease of Q is suppressed by attenuating forces such as penstock frictions and the like. Anyway, Q1 and N1 are apt to decrease with increasing speed as well as they are in a positive feedback circuit.

Figure 5:
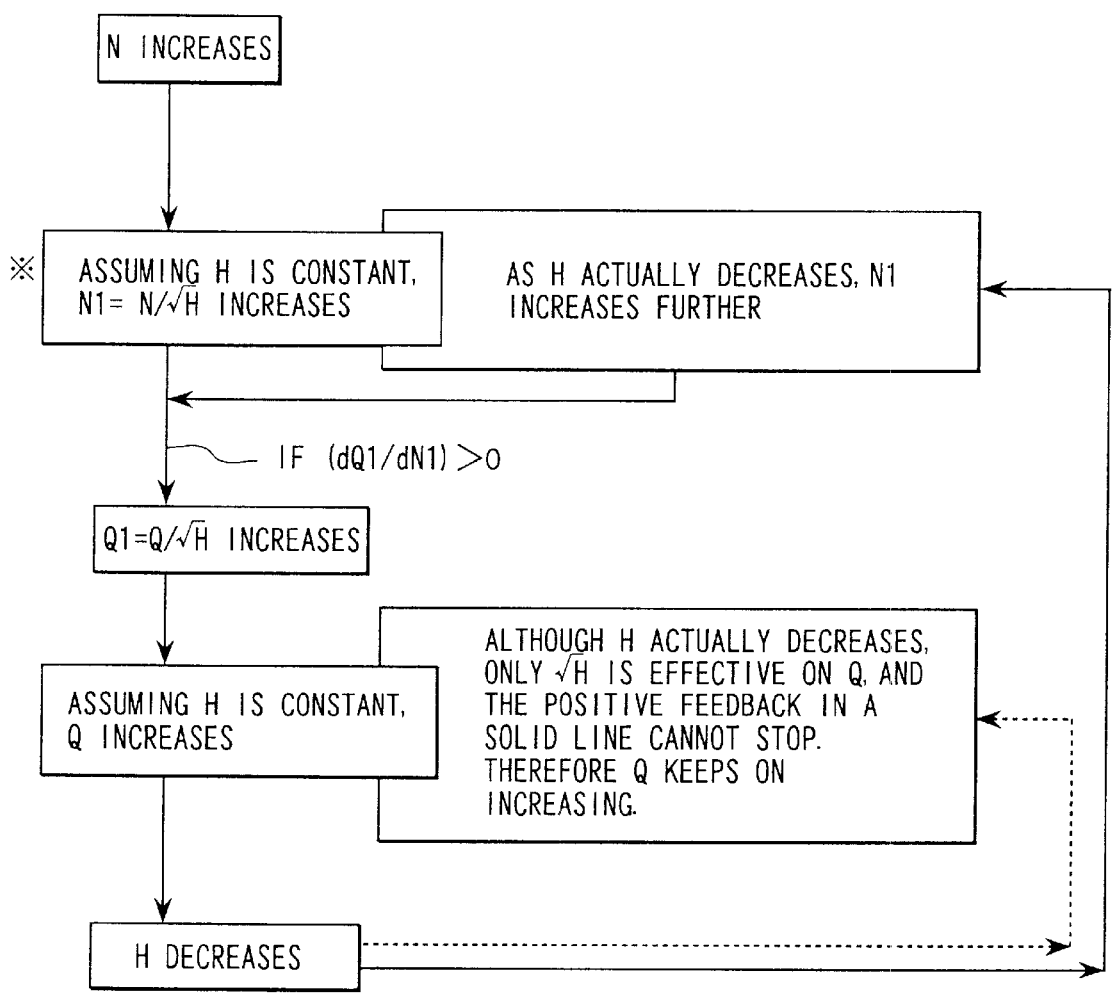
FIG. 5 is another flow chart of the swing-back action affected by the S-characteristics.

When the running point of the pump turbine reaches point h (from point a) in the S-characteristics region, the above phenomenon is gradually eased as well as in a negative feedback circuit. The running point starts to move up (to increase Q1) from a little after point h to point a in the S-characteristics region. This reverse movement of the running point is conducted in the same manner as in the positive feedback circuit. FIG. 5 explains this swing-back.

As stated above, when the guide vanes of the pump turbine are left unclosed after load rejection, the running point of the pump turbine swings on the S-characteristics curve corresponding to the guide vanes. Therefore, the operation depending upon the pump turbine characteristics is detrimental and dangerous in some particular cases. Because the discharge of the pump turbine increases and decreases repeatedly and violent water hammers repeatedly generate in the penstocks of the hydroelectric power station.

Such an unwanted influence made during operation in the S-characteristics region decreases when the S-characteristics region becomes shorter. For example, in case the pump turbine is run along the characteristics curve 2 containing a line segment b-e-i which is made shorter with the opening of the guide vanes smaller, such an influence can be reduced.

The pump turbine operation in the S-characteristics region adversely affects also the torque T of the pump turbine. When the value of N1 decreases in the S-characteristics region, as shown in FIG. 3(B), the T1 value decreases. Here, note that the points a and h on the characteristic curve 1 shown FIG. 3(A) respectively correspond to points a' and h' on the characteristic curve 1' in shown FIG. 3(B).

Assuming that the effective head H is constant, the decrease of T1 means the decrease of the torque T of the pump turbine. Further, it is obvious that the decrease of the torque T of the pump turbine causes a decrease in the number of revolutions N of the pump turbine. As the number of revolutions N of the pump turbine decreases, N1 and T1 decrease in sequence. In actual operations, this decrease progresses with increasing speed as the effective head increases as mentioned above. Therefore, the running point of the pump turbine moves along the characteristics curve 1' from point a' to point h' while moving along the characteristic curve 1 toward smaller Q1. This movement is the same as that in the positive feedback circuit. When the movement is reversed in the S-characteristics region, the running point moves back from point h' to point a' on the characteristic curve 1. Apparently from the above, the torque fluctuation is not acceptable.

It is dangerous to quickly close the guide vanes when the running point of the pump turbine moving down along the S-characteristics curve after load rejection. This is because an action encouraging the decrease of N1 exerts.

Mutual hammer interference

Figure 6:
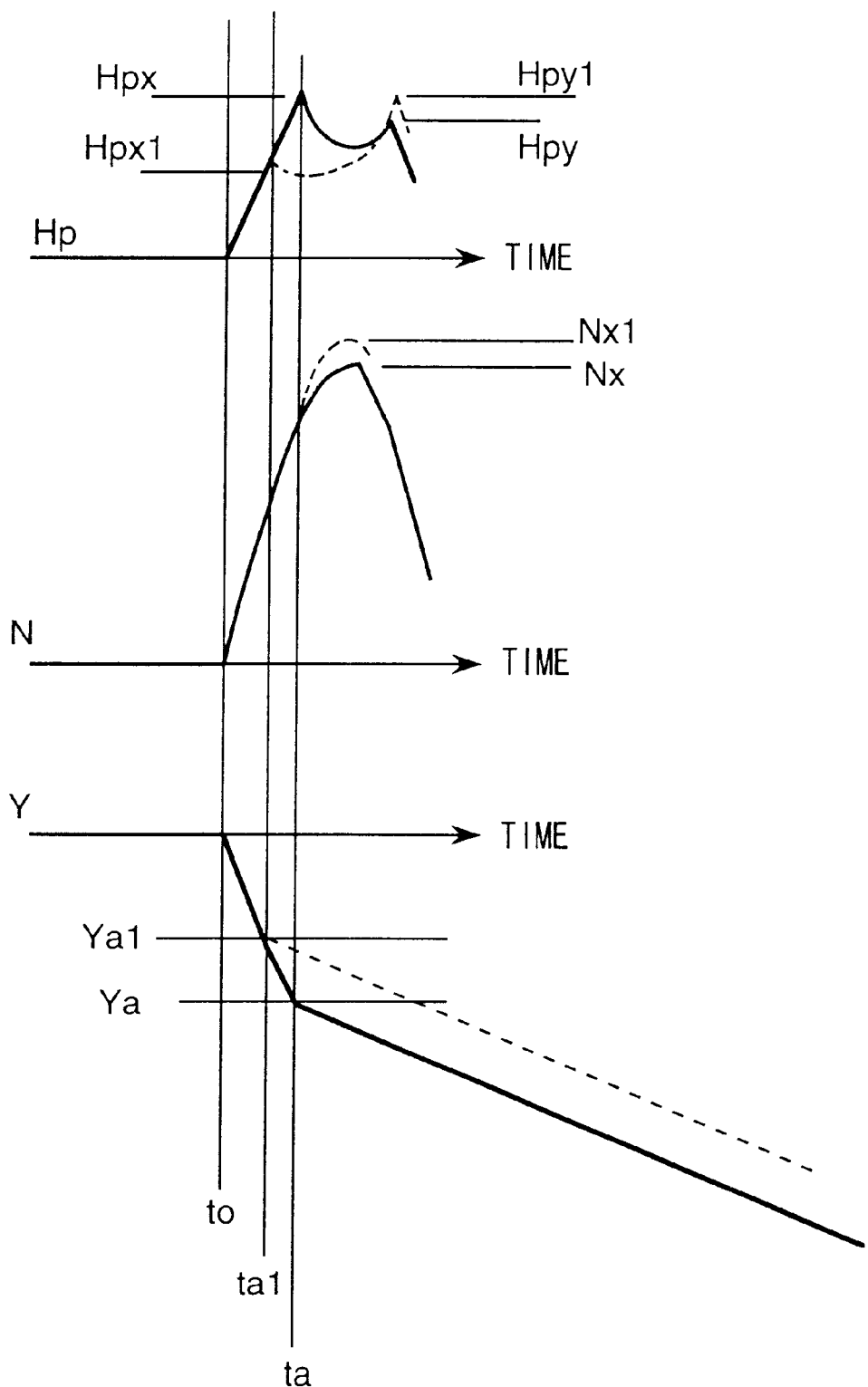
FIG. 6 is a graph explaining the relationship between a closing pattern of guide vanes and water hammering.

In the turbine mode, the influence of the S-characteristics can be suppressed by setting the upper vane closing rate when the opening of the guide vanes is less than for example 80% or by setting a value lower than the upper vane closing rate when the opening of the guide vanes is 80% or more. Upon a load rejection, immediately before the running point enters the S-characteristics region, the vane closing rate changes from "fast" to "slow." A bending is made here in the closing pattern. Referring to FIG. 6, let's assume that, for example, a load rejection is made (at time t0) when the opening of the guide vanes is almost 100%. Initially, the guide vanes close comparatively fast. When the opening of the guide vanes reaches a preset opening value Ya, a smaller closing rate limit is selected.

Therefore, when the running point enters the S-characteristics region in which the pump turbine speed starts to decrease over a maximum value and is moving toward a smaller discharge, the vane closing rate is limited to a comparatively slow rate. This suppresses acceleration of an excessive positive feedback phenomenon due to the above-stated N1 decrease and consequently, an excessive water hammering can be prevented.

FIG. 6 shows a relationship between the vane closing pattern and water hammering particularly the rise of a penstock pressure Hp in the upper reservoir side upon a load rejection depending upon switching of the vane closing rate according to the guide vane closing. In other words, when you increase the opening Ya of the guide vanes at which the vane closing rate is switched from "fast" to "slow," the first peak penstock water pressure Hpx in the upper reservoir side goes down to Hpx1, but the second peak penstock water pressure Hpy goes up to Hpy1. The waveform of the penstock water pressure Hd in the lower reservoir side is just like an upside-down image of the waveform Hp (although it is not visible in FIG. 6) and the decrement Hdy1 of the second peak is lower than Hdy. In other words, when the gradient is limited to a smaller value, the first peak value Hpx goes down and the second peak value Hpy goes up. The most typical example is a case the fast closing rate becomes equal to the slow closing rate under the bending point.

Therefore, depending only on the bending in the guide vane closing pattern, the vane closing pattern has been determined so that the peak value Hpx of the penstock water pressure in the upper reservoir side which appears during fast vane closing immediately after a load rejection may be approximately equal to the peak penstock water pressure value Hpy in the upper reservoir side which appears by the S-characteristics after the speed starts to decrease. Substantially, this is done by adjusting the bending opening Ya, the fast vane closing speed limit when Y>Ya, and the slow vane closing speed limit when Y<Ya.

Figure 7:
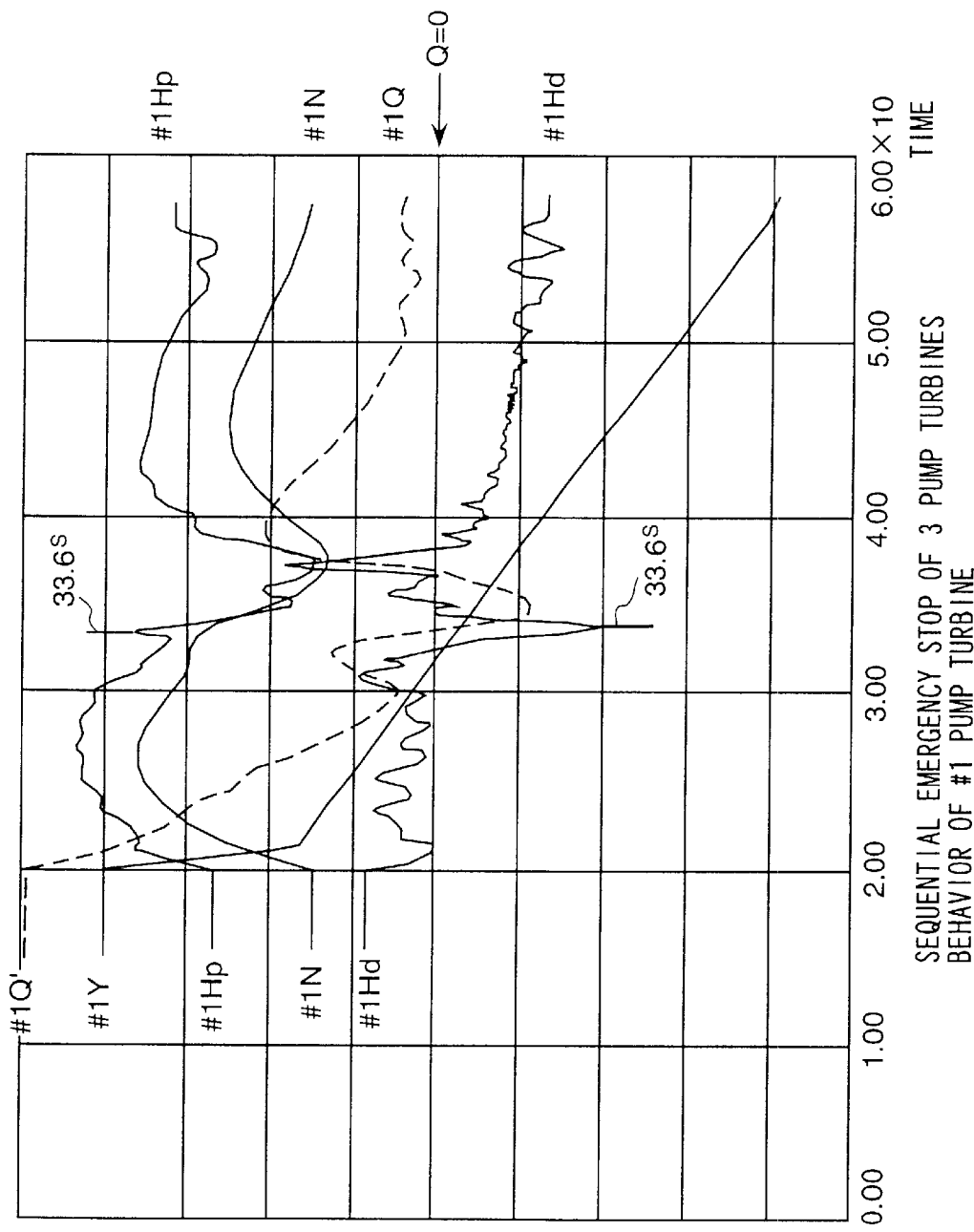
FIG. 7 is a graph explaining the mutual hammer interference according to the conventional control.
Figure 8:
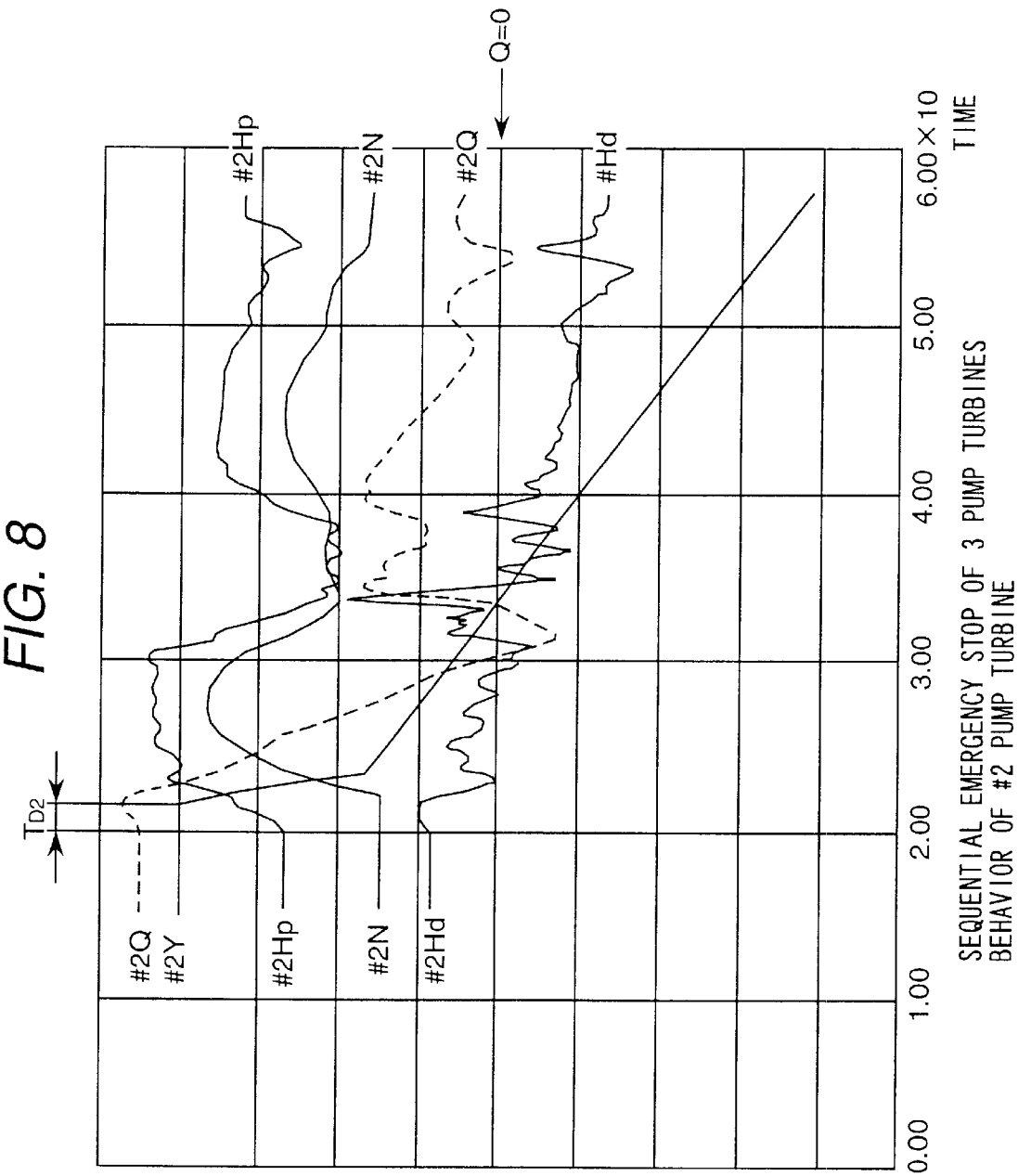
FIG. 8 is a graph explaining the mutual hammer interference according to the conventional control.
Figure 9:
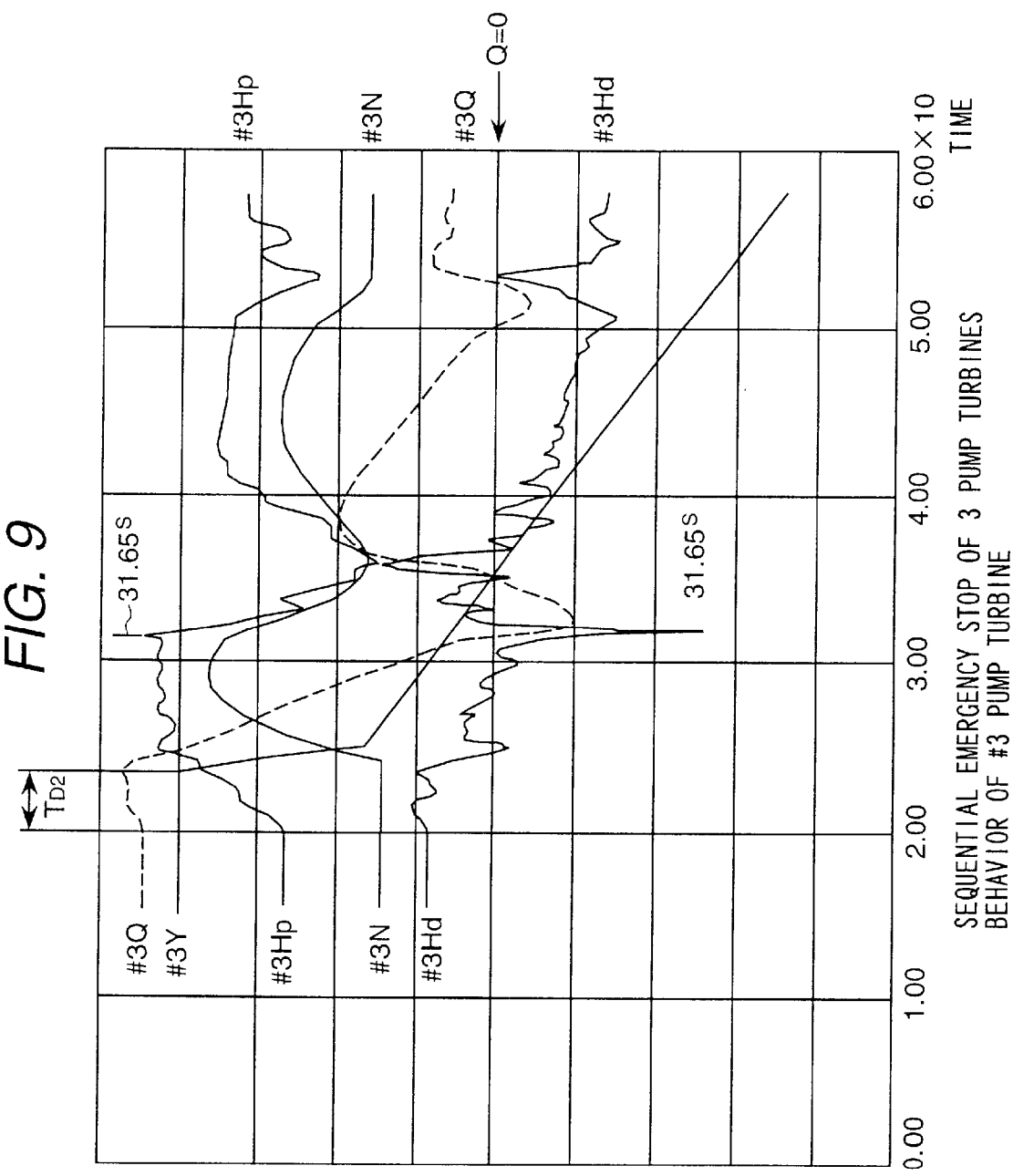
FIG. 9 is a graph explaining the mutual hammer interference according to the conventional control.

The inventors of the present invention recognized that depending only on the bending of the vane closing pattern is not enough. For example, in case a plurality of pump turbines having S-characteristics are coupled in the upstream side, in the downstream side, or in both sides as shown in FIG. 2, it has been well-known that the mutual hammer interference will cause abnormal rise in the upstream water pressure or abnormal fall in the downstream water pressure. Assuming that the pump turbines have the same specifications, there have been various problems. One of the problems is that the maximum upstream water pressure upon sequential load rejections (which reject the loads of the pump turbines one after another) is higher than the maximum upstream water pressure upon a spontaneous load rejection. Another problem is that the minimum downstream water pressure upon sequential load rejections (which reject the loads of the pump turbines one after another) is lower than the minimum downstream water pressure upon a spontaneous load rejection and that separated water columns generate in extreme cases. What is worse, conditions such as time differences to make the case worst are hard to be known in advance as these abnormal hammering phenomena are closely related fine timing of tracing along the S-characteristics. FIG. 7, FIG. 8 and FIG. 9 are graphs explaining why such conditions are hard to be recognized in advance upon the sequential load rejections. These figures assume that three pump turbines are coupled together to one upstream penstock and to one downstream penstock. In this example, the pump turbine #1 is full-load rejected at a time point of 20 second. Td1 seconds later after the full-load rejection, the pump turbine #2 is full-load rejected. Td2 seconds later after the second full-load rejection, the pump turbine #3 is full-load rejected. As the result, the downstream water pressure of the pump turbine #1 drops rapidly at a time point of 33.6 seconds, or 13.6 seconds after a load rejection.

This kind of mutual hammer interference causes sudden spike-like downstream water pressure drops to generate. Nevertheless, to suppress water-column separation in the downstream penstocks of the pump turbines, the pump turbines must be installed as low as possible and assure a sufficient water level difference above the lower reservoir. This greatly increases the quantity of soil to be dug for installation of pump turbines and the construction cost.

Figure 10:
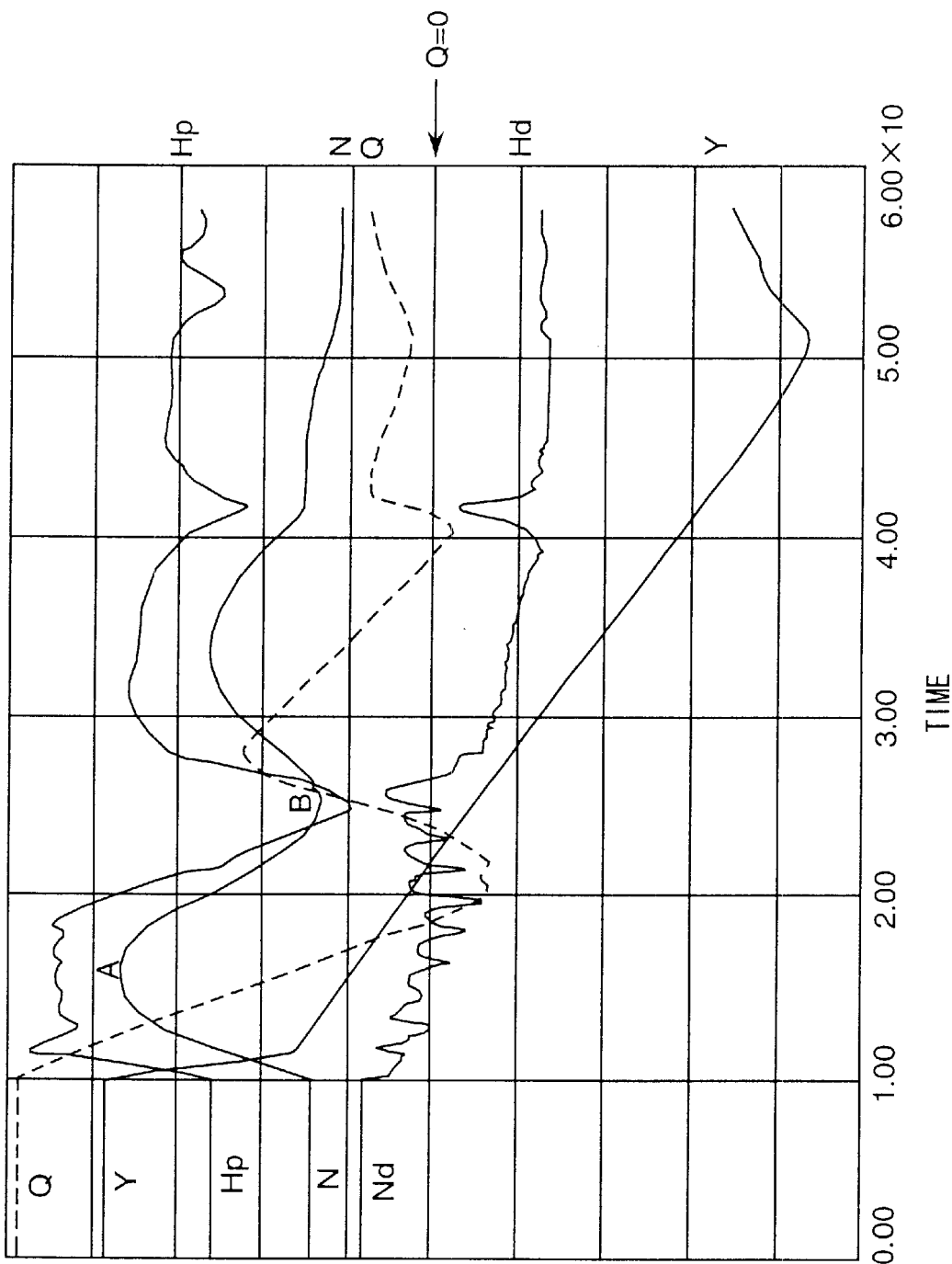
FIG. 10 is a graph explaining transient conditions of the pump turbine upon load rejection according to the conventional control.

In this case, it is not so striking that abnormal water hammerings due to mutual interference appear in the upstream side because the vane closing pattern is set to make the upstream penstock water pressure peak Hpx during vane closing higher than the upstream penstock water pressure peak Hpy which appears by the S-characteristics after the rotational speed starts to decrease when each pump turbine is full-load rejected (see FIG. 10). In other words, this case assumes that Hpx is set fully higher than Hpy and the designed upstream water pressure is made fully high, sacrificing the upstream construction cost. of course, Hpx must be smaller to reduce the upstream construction cost. For this purpose, the mutual hammer interference in the upstream penstocks must be eliminated. Even when the abnormal pressure rise due to mutual hammer interference in the upstream penstock is eliminated by the use of a vane closing pattern in FIG. 10, spikes due to mutual interference in the downstream penstocks still remain. (See FIG. 7, FIG. 8, and FIG. 9.)

Circuit configuration

Below will be explained the circuit diagram of a governor of a pump turbine, referring to FIG. 12. This block diagram contains a speed detector 1 for detecting a rotational speed N of a pump turbine 100, a speed detection signal Xn, a speed controller 2 for setting a reference rotational speed, a set value X0 from the speed controller 2, an adder 3, a restoration signal Xσ coming from the speed control rate setting unit, a signal Xε output from the adder 3 and fed to a PID operation circuit just below, a proportion element 4a (P element) used in a normal power generation mode in which a generator motor is connected to a large power system, and a proportion element 4b (P element) used for no-load operation after a load rejection. The gain Kpa of the proportion element 4a is greater than the gain Kpb of the proportion element 4b.

An integration element 5a (I element) is used in a normal power generation mode. An integration element 5b1 (I element) is used for no-load operation after a load rejection and used while the guide vane detectors 20a and 20b are not working. An integration element 5b2 (I element) is used after the guide vane detectors 20a and 20b work immediately after a load rejection. Their integral gains of Kia, Kib2, and Kib1 satisfy Kia>Kib2>Kib1.

Contacts 19a and 19b detect that the generator motor is load-rejected (e.g. when the speed exceeds a rated speed value) and simultaneously swing to open the lower contact and close the upper contact when a load is rejected. Two contacts on each side 19a or 19b are provided to switch both P and I elements at the same time. Contacts 20a and 20b detect that the guide vanes are closed to a predetermine opening Yz or below and simultaneously swing to open the lower contact and close the upper contact when the guide vanes are closed to a predetermine opening Yz.

The differentiation element 6 (D element) outputs a signal Zd. The proportion element outputs a signal Zp and the integration element outputs a signal Zi. The gain Kd of the differentiation element 6 is adjustable but its time constant T1 is fixed to a small value of about 0.1.

The adder 7 adds these signals. A signal Z output from the adder 7 is a total of the output of the proportion element Zp, the output of the integration element Zi, and the output of the differentiation element Zp. The signal Z is a vane opening command signal. A lower value selecting circuit 23 automatically selects a lower one of the vane opening command signal Z and a set value of a limiter Zl and finally outputs a vane opening command signal ZZ.

An actual vane opening is indicated by a signal Y. An adder 8, a limiter 9, and an oil-pressure servo motor 10 constitutes a kind of oil-pressure amplifier. It constitutes a first order lag element with a limiter as a transfer function and amplifies the vane opening signal Z into a vane opening Y which has a stroke and an operating force strong enough to directly operate the guide vanes which works as a discharge controller. A signal Y$\epsilon$1 indicates a difference between a final vane opening command ZZ and an actual vane opening Y.

A signal Yxxxx is an interrupt signal whose absolute value is great enough to rapidly closing the guide vanes when an emergency stop signal is entered independently of a natural control signal of the governor from the upstream and is usually zero.

An added 24 adds signals Y$\epsilon$1 and Yxxxx and outputs a result Y$\epsilon$2. The limiter 9 contains $\theta$R which limits the vane opening rate to $\theta$R.Cy and $\theta$L which limits the vane closing speed to $\theta$l.Cy. The signal Y$\epsilon$3 is obtained by limiting the difference signal Y$\epsilon$2 considering said vane opening and closing speed limits. A desired vane opening setting signal Yb is given to the adder 11 from the output controller 13. If the actual vane opening Y is smaller than Yb (or Y<Yb), an Open signal $\sigma$ (Yb−Y) is continuously fed to the PID operation unit until the difference Yb−Y becomes zero. Finally, the actual vane opening Y is equal to the vane opening setting signal Yb and the Open signal $\sigma$ (Ya−Y) stops.

The speed control rate setting block 12 sets the above coefficient $\sigma$. In other words, the coefficient $\sigma$ is a gain which determines the ratio of the change of the vane opening Y to the change of the speed detection signal Xn. In general, it is determined considering the role of the relevant plant in the power system or the rate of load sharing. Once it is determined it will never be changed. The governor of the pump turbine also comprises elements of a turbine 14 including a penstock system. The load electric power L of the relevant plant is fed to the generator motor which is directly coupled to the shaft of the turbine. The load electric power RL is supplied from the electric power system. The signal Pg is a combination of load electric powers L and RL or the load of the generator motor. A load characteristic 17b is given from the electric power system. The self-controlling ability block 17a of the turbine 100 is a characteristic block which totals machine losses which increases according to a speed increase, efficiency reduction, and so on. Accordingly, the signal RT indicates a turbine output loss due to the self-control ability accompanied by the change of the rotational speed. Therefore, when viewed from the turbine, RT as well as Pg can be recognized as a kind of load. In other words, their sum can be assumed to be the sum of the loads L$\Sigma$=Pg+RT which consume the output Pt of the turbine. The signal (Pt−L$\Sigma$) is fed to the inertia effect part 16 of the rotor and the output of the inertia effect part 16 of the rotor becomes the rotational speed N.

After a load rejection, the signal Pg becomes equal to the signal L.

Figure 13:
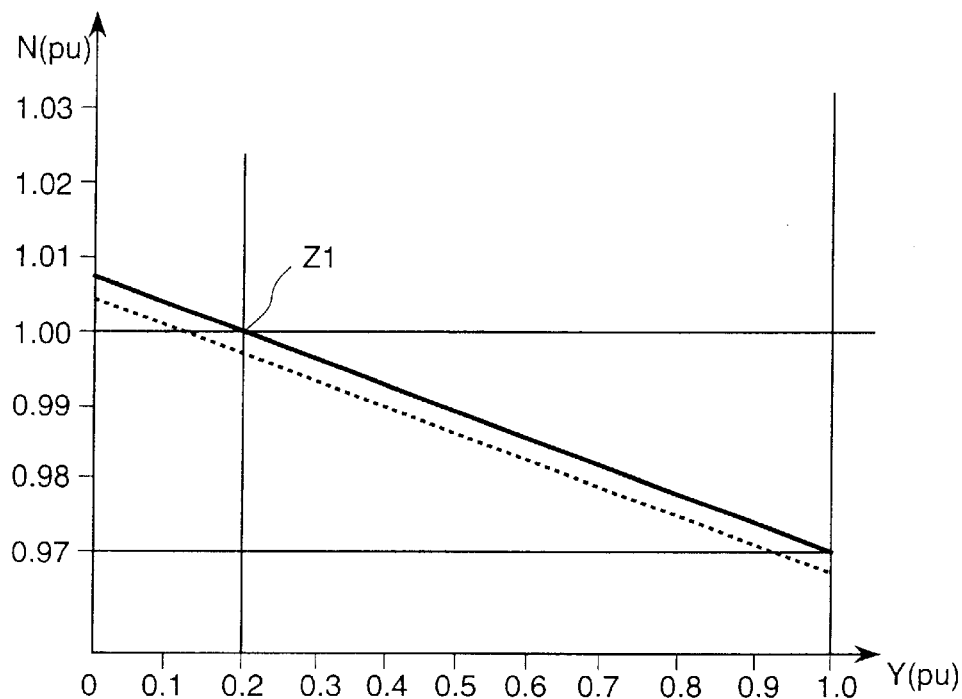
FIG. 13 is a graph explaining the speed control of the governor.

Next, the actions of the speed controller 2, the output controller 13, and the speed control rate setting block 12 will be explained referring to FIG. 13 and FIG. 14, assuming that no-load vane opening is 0.2 (pu). The solid line which goes lower towards the right in FIG. 13 indicates the opening of the guide vanes just before the power plant is connected to an electric power system. In other words, the intersection of this solid line and the rated speed N (synchronous speed) line indicates the opening of the guide vanes. The current no-load vane opening is 0.2. This solid is set lower before the turbine starts. For example, the line is placed on the dotted line in FIG. 13. As seen in this drawing, the speed controller 2 moves up or down the solid line in parallel below the solid line in FIG. 14. The name "speed controller" comes as the intersection (no-load vane opening 0.2) moves up and down vertically.

Next will be explained the behavior of the intersection after the power plant is connected to an electric power system, referring to FIG. 14. Initially, the intersection of the solid line and the rated speed line is at Y=1.0. This indicates "running at 100% load." This line is dotted in FIG. 13.

In this way, the output controller 13 controls the opening of the guide vanes by moving left or right the solid line in parallel. However, when the power plant is connected to an infinite electric power system, the rotational speed is substantially fixed to 1.0. As the intersection on the line N=1.0 moves left and right according to the horizontal movement of the solid line, the name "speed controller" is given.

Figure 14:
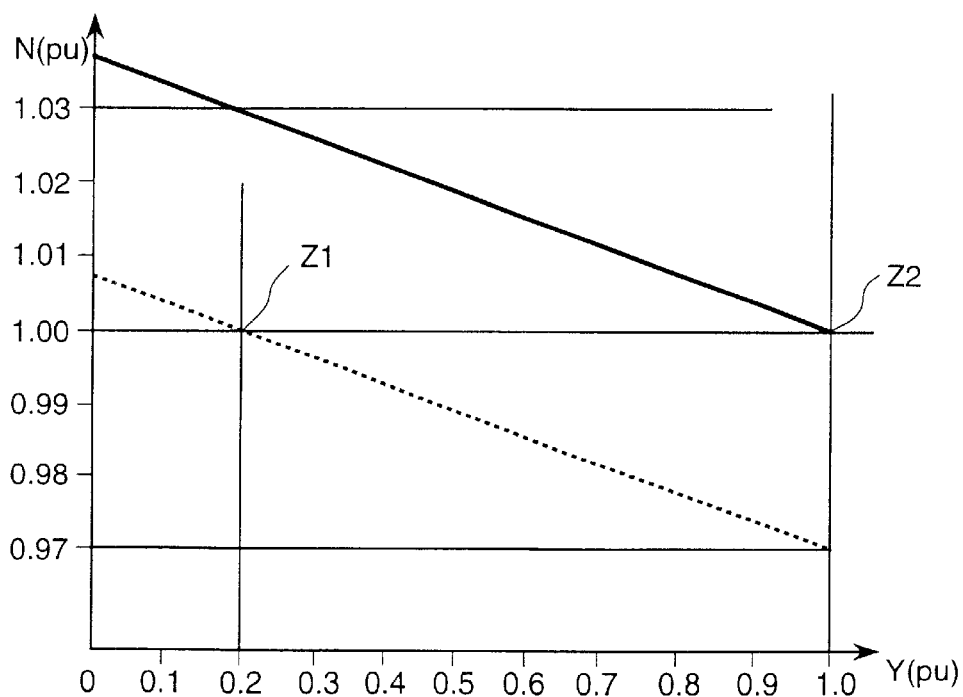
FIG. 14 is a graph explaining power control of the governor.

In the steady status, the pump turbine is operated at a point (N=1.0, Y=1.0) as shown by the solid line in FIG. 14. Let's assume that the frequency of the power system increases by 3% and the rated speed N moves to 1.03.

The vane opening Y goes to 0.2. Similarly, assuming that the frequency of the power system increases by 1.5%, the vane opening Y is set to 0.6. In this way, the speed control rate setting block 12 gives a proportional relationship between the frequency change width and the vane opening width. As the gain of the speed control rate setting block 12 increases, the solid line in FIG. 14 decreases more drastically towards the right. And the gain of the vane opening response width to the frequency change decreases. Therefore, if a load rejection occurs while the pump turbine is running at a rated speed (N=1.0) and a full load (100%) (on the solid line in FIG. 14), the governor works to finally set the rotational speed N to 1.03 (higher than the rated value by a controlled speed increment).

Figure 15:
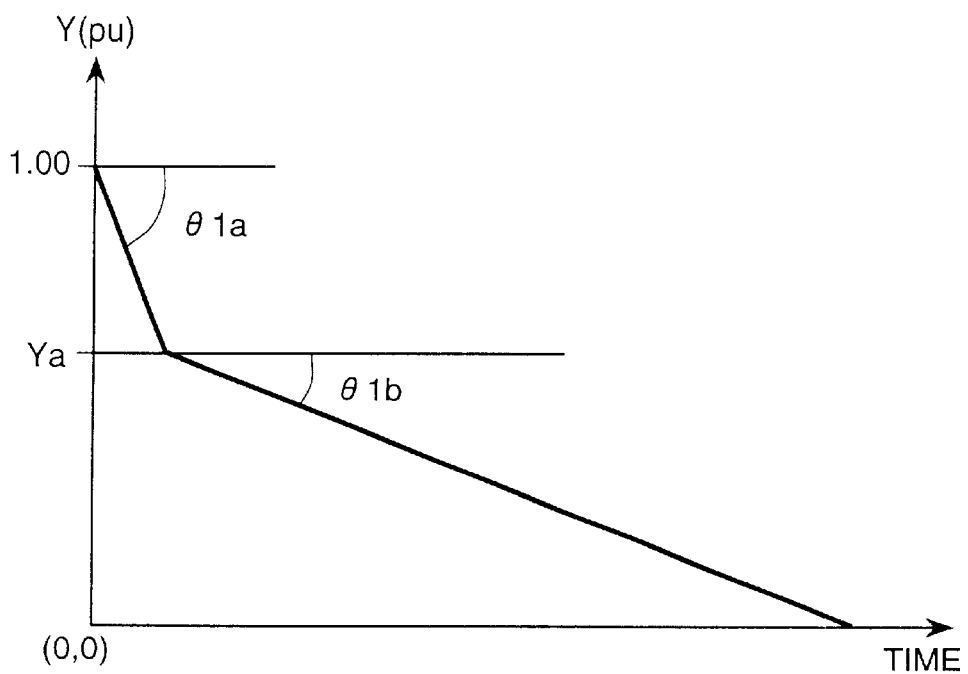
FIG. 15 is a graph explaining the limitation of the rate of closing the guide vanes.
Figure 16:
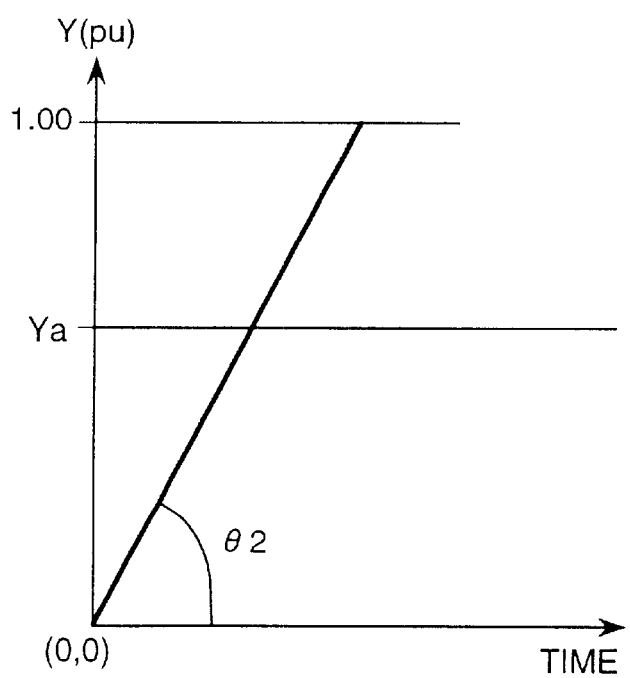
FIG. 16 is a graph explaining the limitation of the rate of opening the guide vanes.

FIG. 15 is a typical example showing a vane-closing speed limit of a pump turbine.

Conventionally, the rotational speed of a pump turbine is limited so that the gradient of the line may not be greater than $\theta$1a if the vane opening Y is greater than a preset vane opening Ya or the gradient of the line may not be greater than $\theta$1a (which is smaller than $\theta$1a) if the vane opening Y is smaller than a preset vane opening Ya. In other words, $\theta$L of the element 9 shown in FIG. 12 is set to tan $\theta$1a/Cy which is comparatively great if the vane opening Y is greater than a preset vane opening Ya or to tan $\theta$1b/Cy which is comparatively small if the vane opening Y is smaller than a preset vane opening Ya. On the other hand, as the vane opening operation is not affected by the S-characteristics as in the vane closing operation, θL is set to θ2 satisfying $|\theta 1a|>|\theta 2|>|\theta 1b|$ independently of a vane opening.

Below will be explained a method of setting integral gains Kib1 and Kib2, a proportional gain Kpb, and differential gain Kd, which is a major point of interest. In the steady status of the pump turbine after a load rejection, or when the guide vanes are closed to a preset opening after a load rejection and no more anti-S-characteristics control is almost required, the gains are set in the same manner as in the conventional no-load operation. For example, Kpb and Kib2 can be determined by an up-/down-stream penstock time constant $Tw(=\Sigma Li.Vi/(g.H))$ and atimeconstant $Tm(=0.00274\ GD^2NO^2/Kw)$ of the inertia effect of the rotor. The resultant gains are Kpb=0.3 Tm/Tw, Kib2=0.25 Kp/Tw, and Kd=0.3 Kp.Tw.

Figure 17:
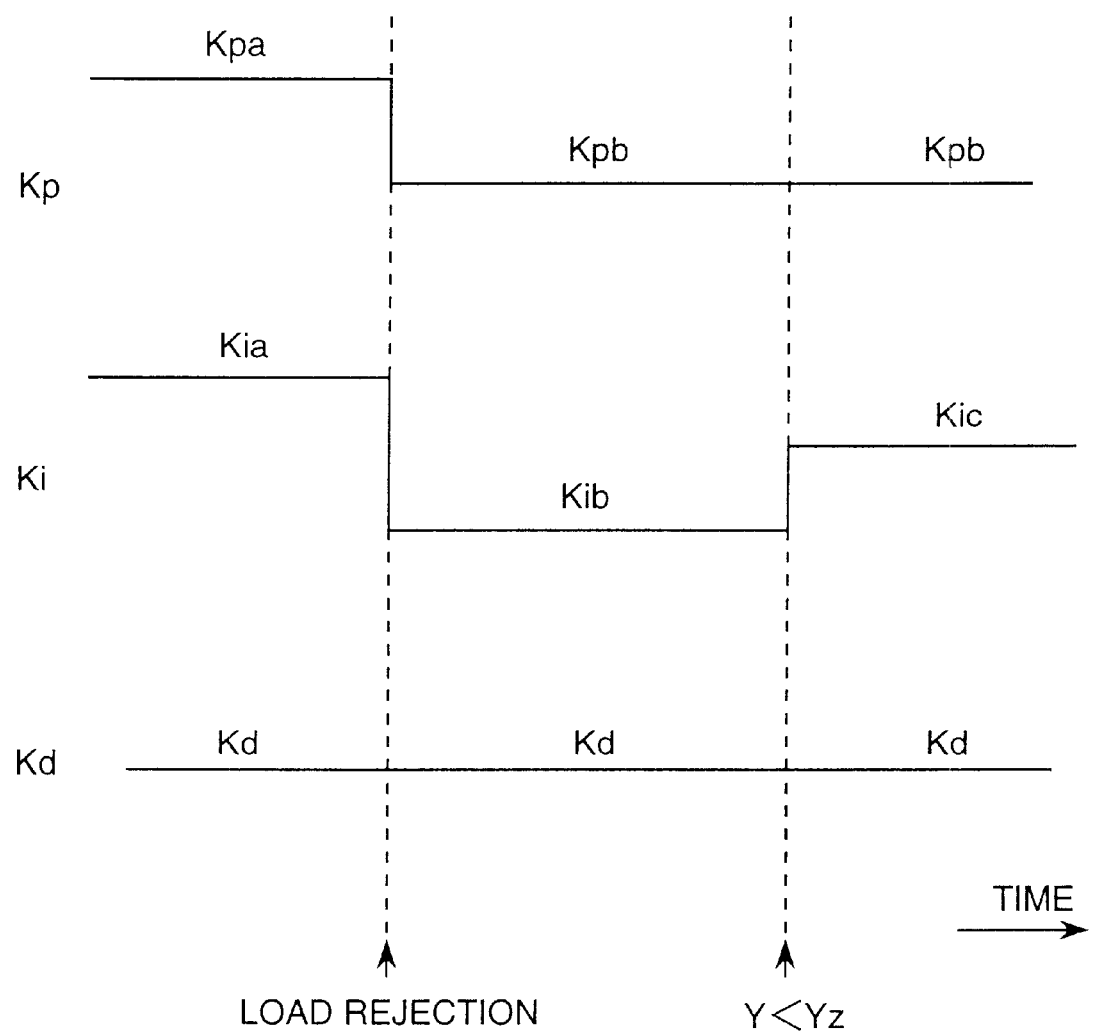
FIG. 17 is a graph explaining a changeover scheme of the gains of Kp, Ki, and Kd of PID control elements.

In other words, the gains can be determined by time constants Tw and Tm without considering the S-characteristics. In the above time constant expressions, Li, Vi, g, H, $GD^2$, NO, and Kw are respectively the length of each penstock (meter), the velocity of water (meter per second) in each penstock, the acceleration of gravity (meter per second$^2$), the effective head (meter), the inertial constant of the rotor $GD^2$ (ton-meter$^2$), the rated rotational speed (revolutions per minute), and the rated output (kilowatt) in that order. However, for anti-S-characteristics control or to temporarily open the discharge controller which is closing in the leading half of the first speed decrease curve and consequently to stop the first speed decrease at a rotational speed which is higher than the rated speed by one third of the first peak minus the rated speed or more and to turn the discharge controller to increase the speed, the stability must be increased by far. Particularly, the gain Kib1 must be smaller by far. Kp, Ki, and Kd are set as shown in FIG. 17. Kp and Ki change upon a load rejection or when Y<Yz.

Figure 18:
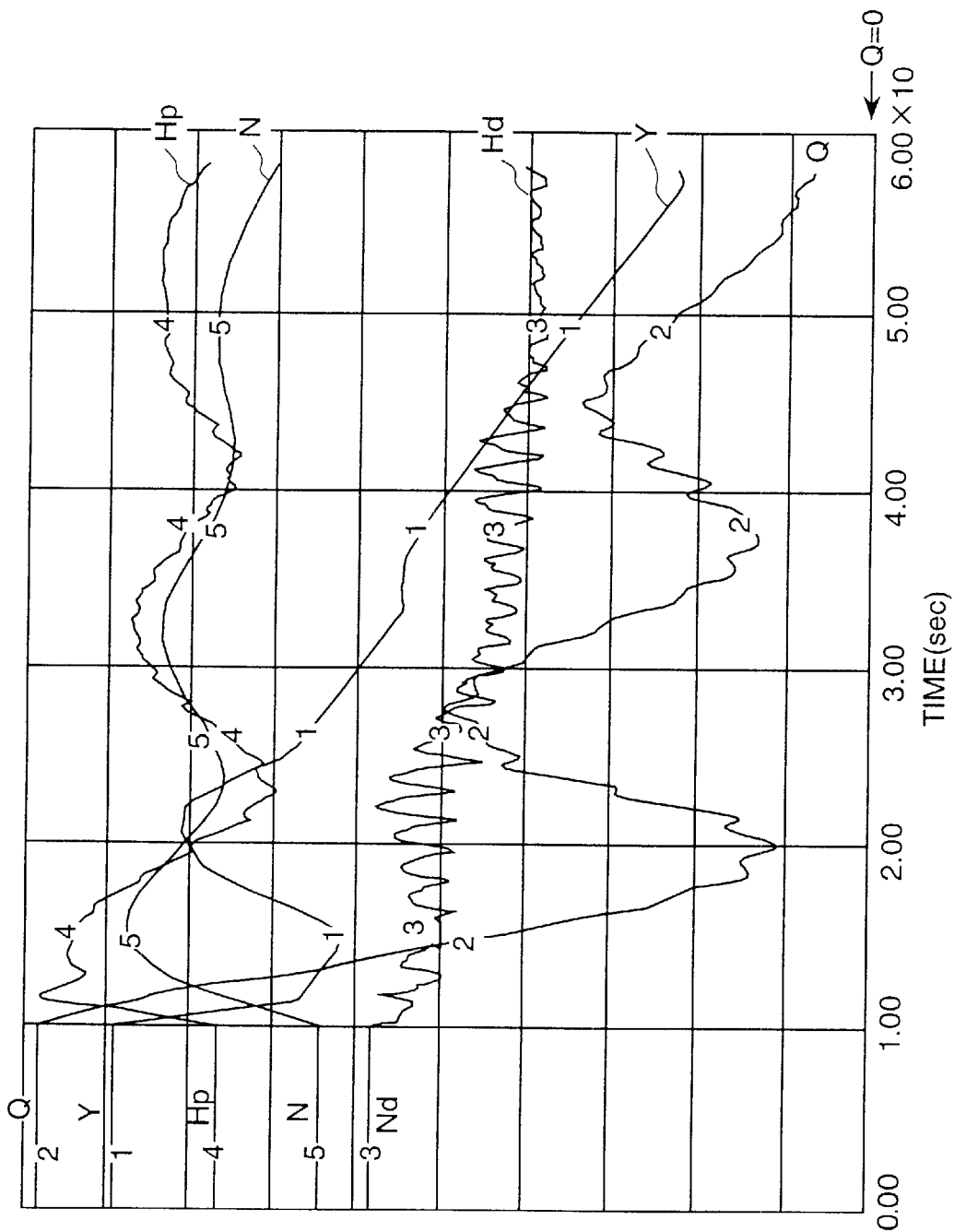
FIG. 18 is a graph explaining transient conditions of the pump turbine upon load rejection according to the invention.
Figure 19:
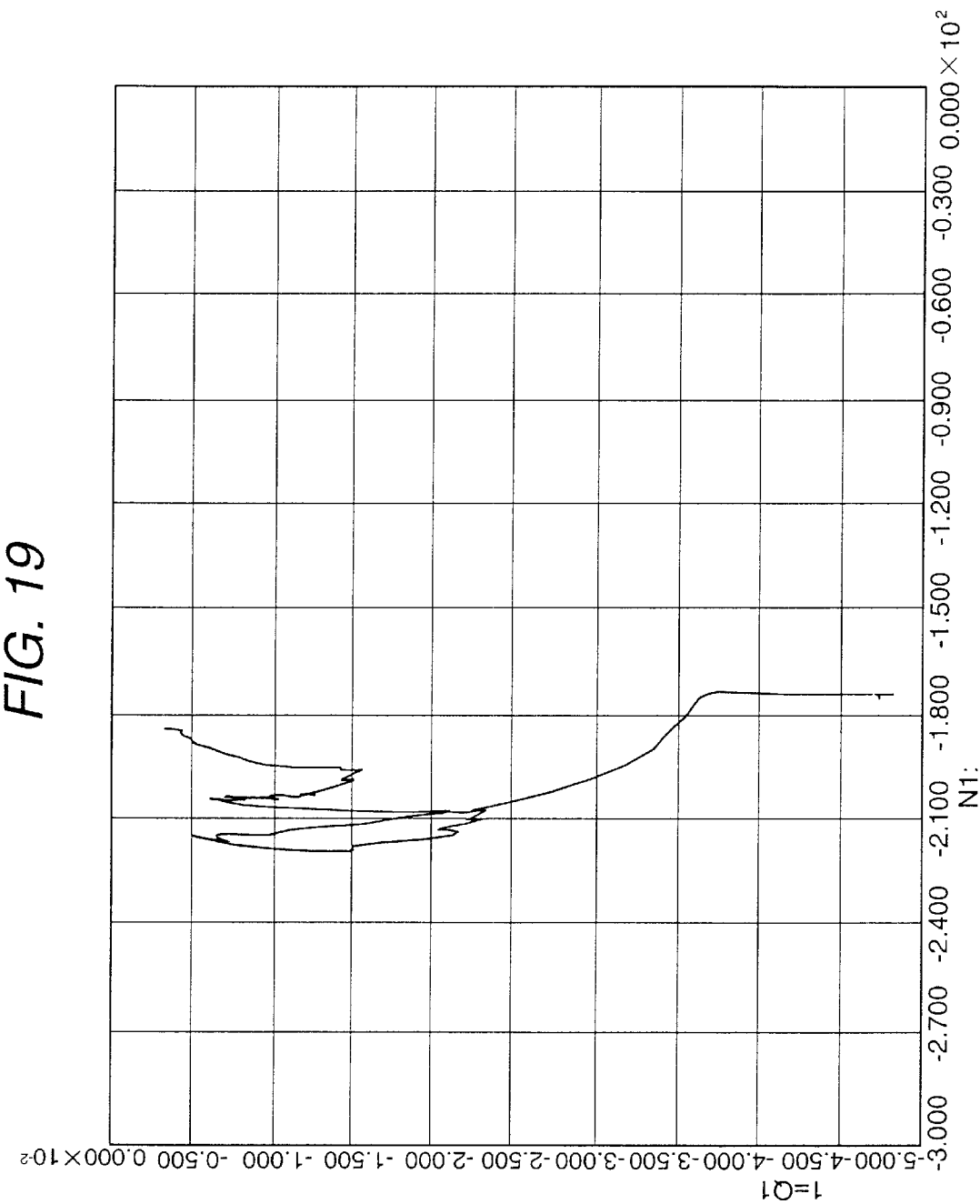
FIG. 19 is a graph showing a trajectory of the operation point of the pump turbine upon load rejection according to the invention.
Figure 20:
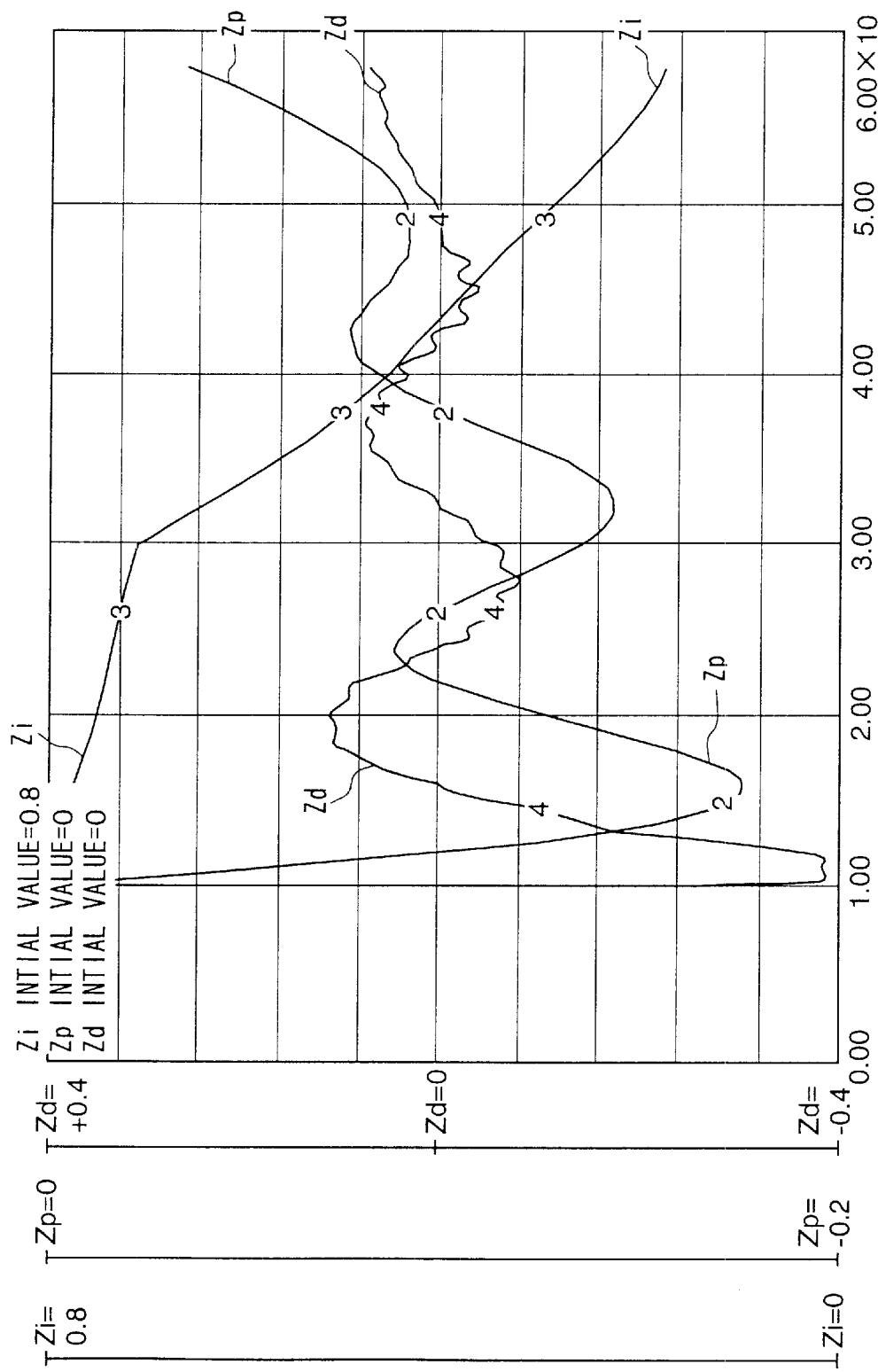
FIG. 20 is a chart of responses of the PID controls of the governor.

FIG. 18, FIG. 19, and FIG. 20 show transient phenomena of a 500-meter-penstock pump turbine to which the present invention is applied. This example assumes Kd=3.45, Kpb=0.5, Kib1=0.02, and Kib2=0.1. As only the gain Kpb is used as Kp without switching after a load rejection (see FIG. 12), Kpb is made smaller (approx. ⅕) than usual considering the anti-S-characteristics control. Although there is another method proposed to change gains from Kpb1 to Kpb2 when changing from the anti-S-characteristics control to a no-load steady operation under conditions of Y<Yz, only integration elements are switched to suppress bumping.

Accordingly, the anti-S-characteristics control is performed, as expected, while the guide vanes are closing (see FIG. 18). As the result, the discharge rate converges on a no-load discharge rate smoothly without causing any reverse flow. Similarly, the second wave Hpy of water hammering Hp almost disappears. FIG. 19 shows the behavior (N1–Q1 movement) of this pump turbine. As seen from FIG. 19, it is apparent that the guide vanes opens when the running point moves along the S-characteristics curve toward a smaller discharge or closes when the running point moves along the S-characteristics curve toward a greater discharge and that the vibration specific to the S-characteristics is suppressed considerably.

FIG. 20 shows the response of the governor or the output responses of the PID elements in this status. The vane opening detectors 20a and 20b detect Y<Ya by the opening of the guide vanes 20 seconds after a load rejection. This is why the Zi curve is sharply bent at a time point of 20 second after a load rejection.

Figure 21:
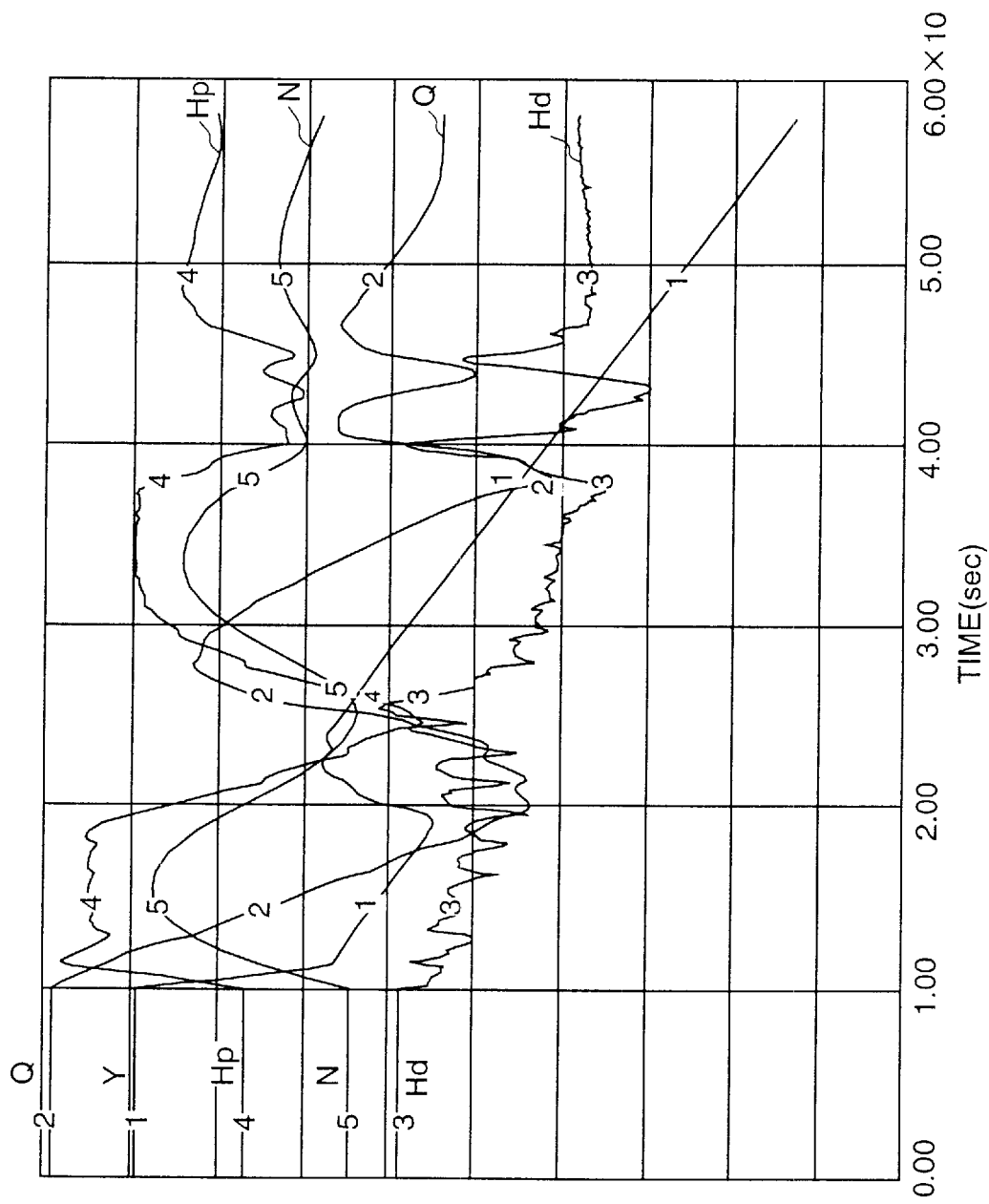
FIG. 21 is another chart showing transient conditions of the pump turbine upon load rejection according to the invention.

FIG. 21 is a graph explaining what will happen when the gains Kpb and Kib2 are got closer to the setting for a no-load operation under conditions of Kd=3.45, Kpb=1.0, and Kib1=Kib2=0.1. In detail, the Kib1 and Kib2 values are approximately one third of those in the usual no-load steady operation and Kpb is approximately half of those in the usual no-load steady operation. For such an insufficient gain setting whose gains are not fully small, the guide vanes starts to open in the trailing half of the first speed decrease curve. This does not suppress vibration by the S-characteristics. On the contrary, it promotes the vibration. As stated above, it is hard to set for anti-S-characteristics control without a reference, but the present invention can offer the reference and the setting can be made easily.

Although the setting for the anti-S-characteristics control can be left used also in the steady status, some demerits may arise as you can see from the above description. Such demerits are that the response of the governor becomes too delayed and that the speed decrease after a load rejection is delayed too much.

Figure 22:
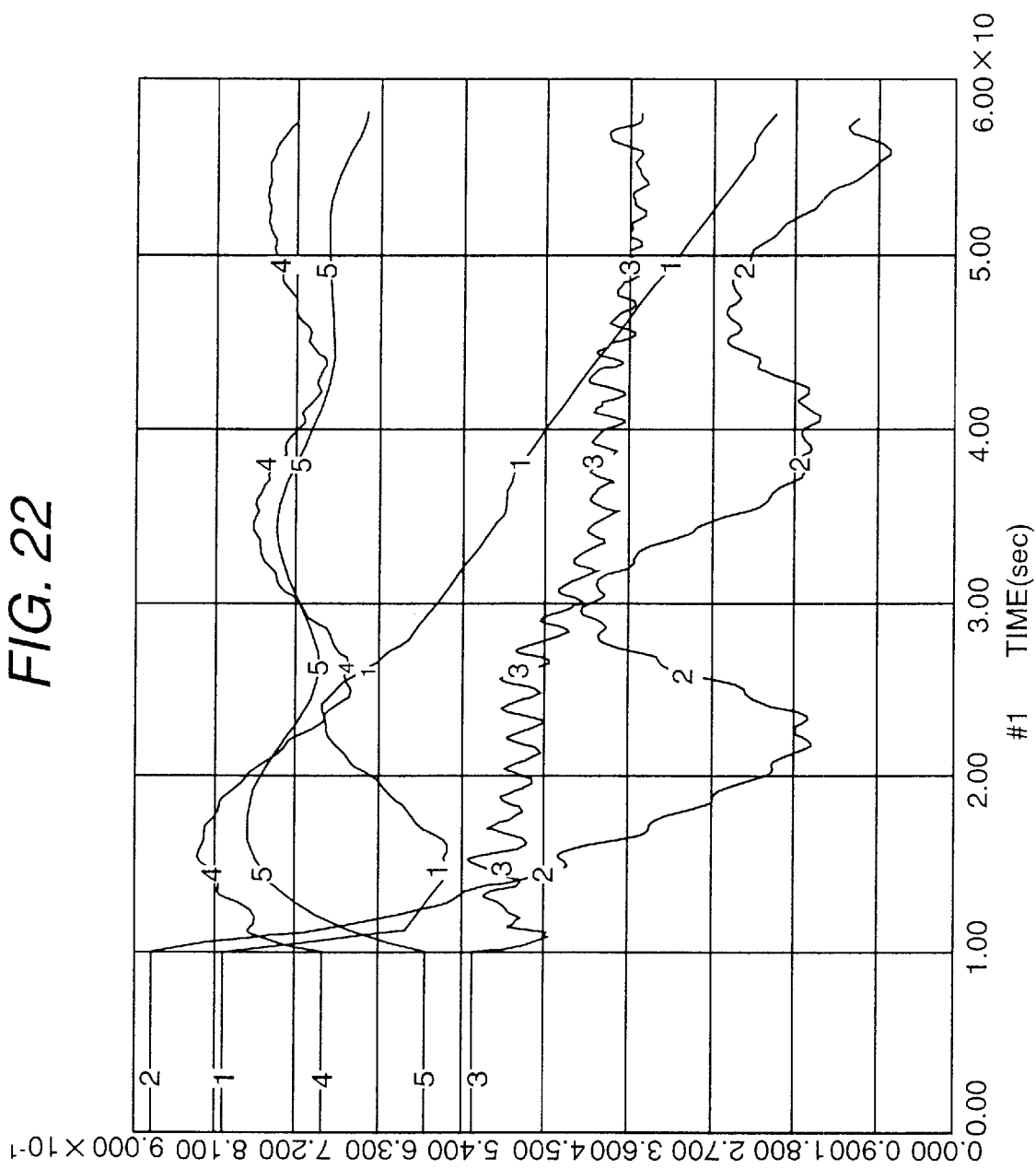
FIG. 22 is a transient phenomenon of pump turbine #1 upon one-after-another load rejection.
Figure 23:
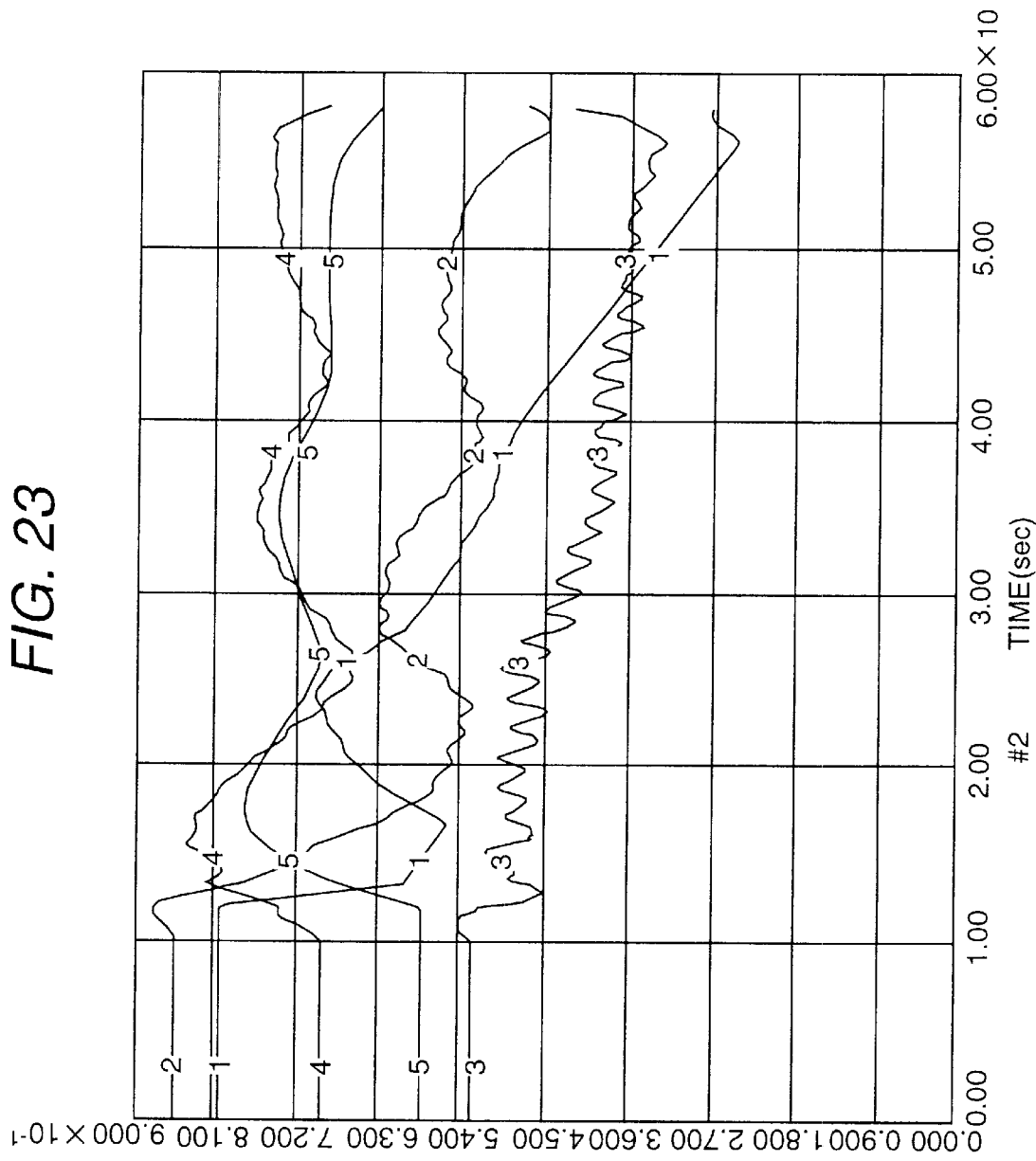
FIG. 23 is a transient phenomenon of pump turbine #2 upon one-after-another load rejection.
Figure 24:
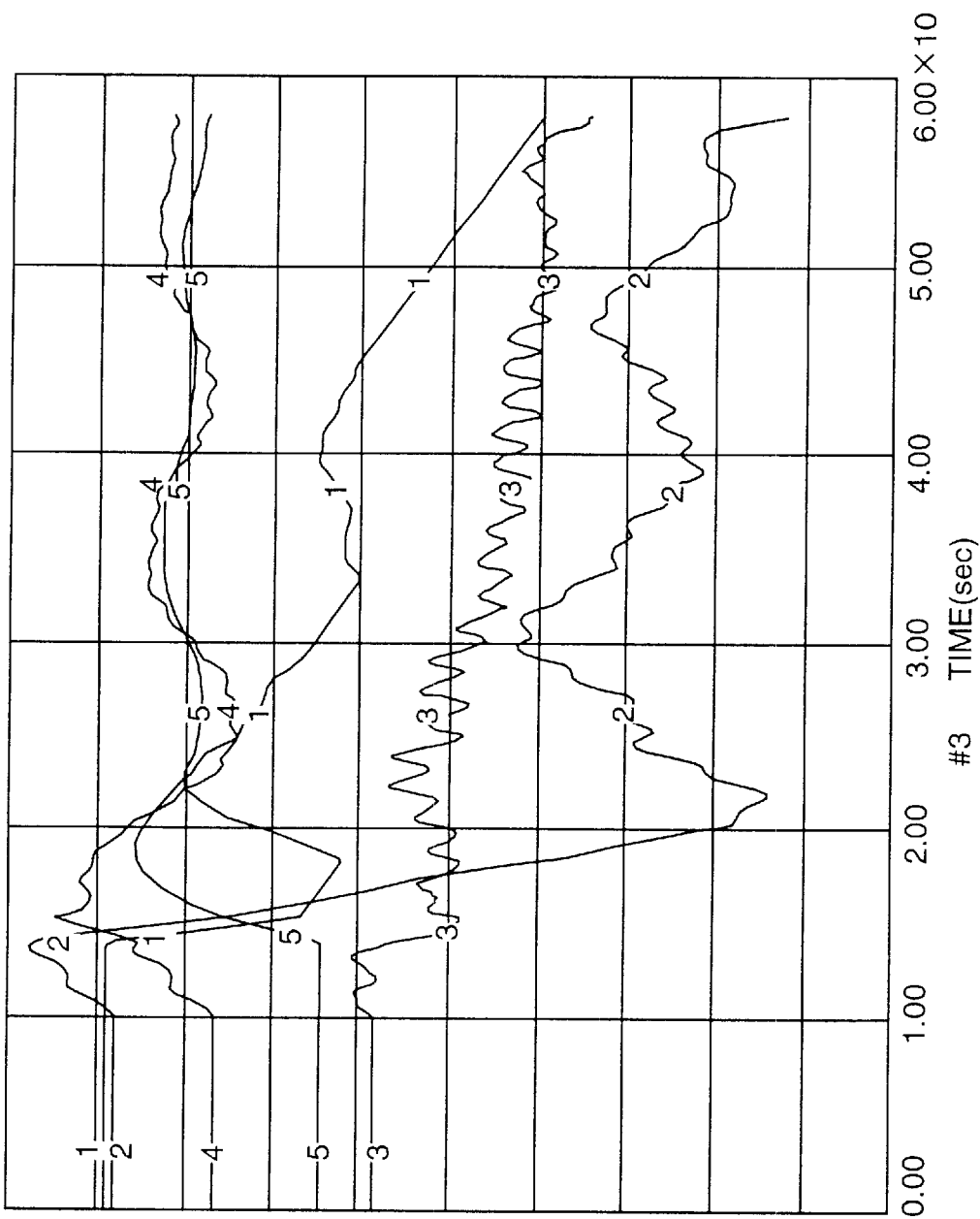
FIG. 24 is a transient phenomenon of pump turbine #3 upon one-after-another load rejection.
Figure 25:
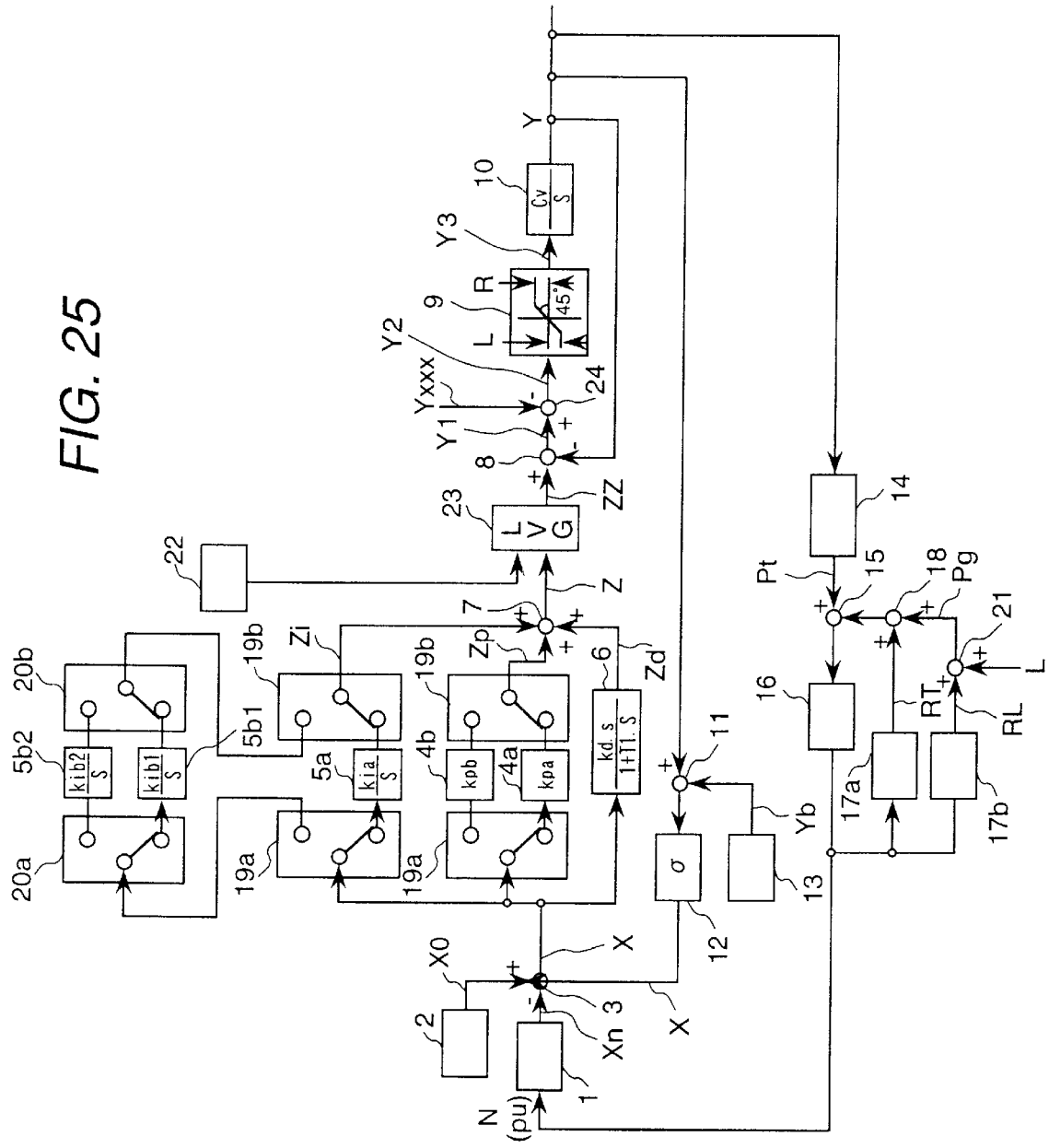
FIG. 25 is a schematic block diagram of a governor which is another embodiment of the present invention.

FIG. 22, FIG. 23, and FIG. 24 show transient phenomena of three pump turbines which share an identical penstock and are sequentially load-rejected under conditions given in FIG. 18 and FIG. 19. The effect by the present invention is apparent when they are compared by those of FIG. 7, FIG. 8, and FIG. 9. In other words, no spikes by an extraordinary hammering interference will occur in the downstream water pressure. The upstream water pressure is extremely calm.

Figure 12:
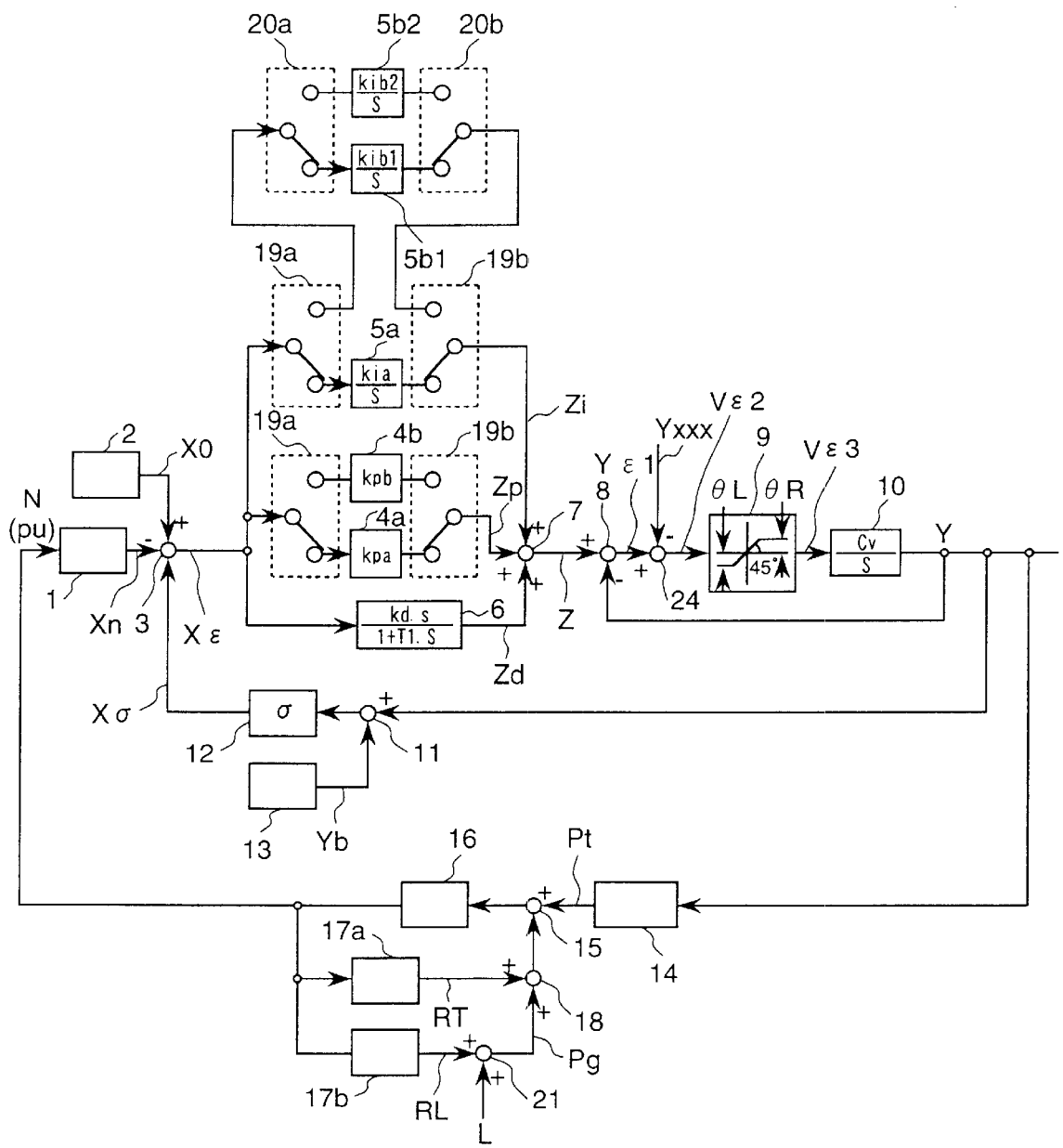
FIG. 12 is a schematic block diagram of the governor.

In FIG. 12, FIG. 18, and FIG. 19, the anti-S-characteristics control is executed by switching P and I gains only.

However, it is possible to make such a control for increasing the set value X0 of the speed controller 2 effective at an adequate timing by combining thereof.

As explained above, the pump turbines in accordance with the present invention can greatly compress the range of an abnormal discharge fluctuation due to the S-characteristics, which can also reduce the transient water thrust fluctuation upon the pump turbines greatly. This enables rationalized designing of the thrust bearings. Conventionally, to suppress abnormal hammer interference, the operation of each of the pump turbines sharing an up- or down-stream penstock must be limited in some cases. However, the present invention can free the pump turbines from such limitations.

Further, the method of the present invention can suppress an excessive flow fluctuation upon a load rejection. This can reduce vibrations, noises, and so on, improves the running status of the pump turbines, and prolongs their service lives. It is needless to say that the effects of the present invention all contribute to the reduction of cost in building a pump-up power plant and, what is more, the object of the present invention can be attained exactly just by modifying the setting method of the governor.

As the method in accordance with the present invention can converge the water discharge smoothly on a no-load discharge without any excessive discharge fluctuation upon a load rejection, the range of the upstream water pressure rise can be almost eliminated particularly by reducing the second peak Hpy. Therefore, the first peak Hpx can be reduced greatly under any condition of always keeping the first peak Hpx over the second peak Hpy. Therefore, the method in accordance with the present invention can greatly reduce the designed water pressure in the upstream penstock and the pump turbine itself.

Further, also for the downstream penstock, the method in accordance with the present invention can greatly reduce the water drop width due to the S-characteristics. Particularly, the method can greatly lessen the abnormal spikes due to mutual water hammer interferences among pump turbines which share a downstream penstock.

Therefore, the pump turbines can be installed on higher locations over the water level of an identical lower reservoir, which leads to reduction in the quantity of soil to be dug and the resulting construction cost (in case of an underground power station).

As already explained, the method of the present invention can fully lessen the influence by the S-characteristics upon the performance of a pump turbine steadily and inexpensively even when the running point of the pump turbine is in the S-characteristics region.

A pump turbine or a method in accordance with the present invention can fully lessen the influence due to the S-characteristics even when the running point of the pump turbine is in the S-characteristics region. In other words, "the leading half of the first speed decrease curve after the first speed increase upon a load rejection turns into decrease over a first peak" means the region of the performance curve where the running point of the pump turbine goes down towards a smaller discharge along the S-characteristics curve. In this status, it is necessary to reduce gain of the governor, particularly integral and proportional gains, for example when the governor is a PID governor, until the discharge controller which is closing by the governor temporarily turns to decrease. This emphasizes the influences by the differentiation elements and starts the temporary opening of the discharge controller (or the guide vanes) in the leading half of the first speed decrease curve. For a damping type governor including incomplete differential elements in a restoration circuit, the integral gain and the proportional gain can be reduced by increasing the damping gain and the time constant.

If the above gain decrease is insufficient, the temporary opening of the guide vanes is delayed and starts in the trailing half of the first speed decrease curve. This decreases the anti-S-characteristics effect and, what is worse, gives unwanted influences to the operation of the pump turbine. This is because the running point of the pump turbine stops moving along the S-characteristics towards a smaller discharge in this stage and returns to move up towards a greater discharge. If the guide vanes are opened in this stage, the S-characteristics are dynamically increased.

Further, the width of the temporary vane opening must be great enough to effect the anti-S-characteristics control. For this purpose, the first speed decrease must stop at a rotational speed higher than the rated speed by one third of the difference between the first peak value and the rated speed and the speed increase starts again from there. This is an estimated reference to effect the anti-S-characteristics control although it somewhat depends upon characteristics of pump turbines. For example, the embodiment of the present invention (using a PID governor) has reference values of Kp=0.5, Ki=0.1, and Kd=3.45 for a no-load steady operation and Kp=0.5, Ki=0.02, and Kd=3.45 for the anti-S-characteristics control.

The setting of the arithmetic means of the governor should be automatically started under a proper condition upon a load rejection.

Although only PID gain control is explained for the anti-S-characteristics control, more effects can be obtained by combining said control with a control to temporarily increase a control setting for a target speed of the governor and the like.

It is necessary to automatically reset the arithmetic means of the governor to a setting to improve a response speed (a setting for a no-load steady operation) which is faster than the setting for the anti-S-characteristics control before the running point of the pump turbine finally settles down to a no-load operation after passing through the S-characteristics region.

This is because the slow speed decrease will keep on running the pump turbine and the generator motor at high speeds, make the speed return slower after a load rejection, and make the responses slower when the pump turbine is reconnected in parallel to a power system.

A first sample condition of automatically switching from the setting for the anti-S-characteristics control to the setting for a no-load steady operation is to detect that the discharge controller is closed to a predetermined opening or below after a load rejection (Y<Yz).

Another sample condition of automatically switching from the setting for the anti-S-characteristics control to the setting for a no-load steady operation is to detect that the speed after a load rejection goes below a predetermined value. For the anti-S-characteristics control after a load rejection, the governor setting should be the response priority setting considering the stability in the usual loaded operation (in which the stability of the power system can be used) and immediately reset to an intermediate setting for a no-load steady operation outside the S-characteristics region. Therefore, the governor should have three response speed indexes of "Normal loaded operation," "No-load steady operation," and "Anti-S-characteristics control immediately after a load rejection" in that order and automatically change these response speeds.

Changing the set values of the governor should be made smoothly (without a bumping). Particularly, if the guide vanes jump under the anti-S-characteristics control, the pump turbines sharing a penstock may produce abnormal mutual hammer interferences.

One example of such a bumpless switching is to switch only integral gains when the governor is a PID governor having proportion, integration, and differentiation elements.

The governor of the pump turbine in accordance with the present invention comprises a closing speed limiter which limits the closing speed of the guide vanes according to the opening of the discharge controller. If the closing speed limiter is designed to limit the closing speed of the discharge controller to a second predetermined value or below which is comparatively higher while the opening of the guide vanes goes over a first predetermined value and to a third predetermined value or below which is comparatively lower after the opening of the discharge controller goes below a first predetermined value, the arithmetic means of the governor should be controlled so that the temporary opening of the guide vanes which are closing may not start until the guide vanes are closed to a predetermined opening or below at least immediately after a load rejection. This is because it is required to close the guide vanes as quickly as possible before the running point enters the S-characteristics region and to make the succeeding S-characteristics as small as possible. If this is omitted, the first speed peak after a load rejection will be increased too much.

The time point at which the running point of the pump turbine stops moving along the S-characteristics curve is approximately an inflection point or vicinity at which the speed decrease curve changes from a convex curve to a concave curve although it depends upon the characteristics of pump turbines. Accordingly, the temporary opening of the guide vanes by the correction-control should be continued at latest starting from a time point at which the rotational speed after the load rejection starts to decrease over the first peak to a time point at which the speed curve changes from "peak" to "bottom." The arithmetic means of the governor should be set with the above as the reference.

In some cases, it may be more effective to start the temporary opening of the guide vanes a little earlier before the rotational speed reaches the first peak. This is because the first speed peak will never be raised and reversely, the anti-S-characteristics control performance will reduce drastically if the temporary opening timing is delayed.

Finally, it is rational that the temporary opening of the guide vanes is made a little earlier before the speed rise after the load rejection stops (the first peak) and that the temporary opening continues to an inflection point or vicinity at which the speed decrease curve changes from a convex curve to a concave curve.

It should be when a load rejection is exactly detected that the setting of the arithmetic means of the governor is switched to the anti-S-characteristics control setting. For this purpose, the circuit breaker contacts for the current plant only are not enough. Therefore, the switching should be made when the speed exceeds a predetermined value which is much higher than the rated speed (which never takes place in a usual loaded operation of the pump turbine).

A second embodiment will be explained below referring to FIG. 22. This embodiment further comprises a load limiter 22. The other parts of this embodiment are functionally the same as those of the first embodiment and their explanation is omitted here.

If the anti-S-characteristics control after a load rejection has a trouble which prolongs a time period between the exit from the S-characteristics region and the reach to a no-load operation or which increases the width of the temporary opening of the discharge controller, the trouble can be eliminated by simultaneously operating a protective controller which limits the opening of the discharge controller according to a predetermined program after a load rejection. One of recommended proposals is to close the load limiter 22 according to a predetermined program after a load rejection. (The upper limit before a load rejection is approximately 1.0 per unit.) With this, even when the output Z of the arithmetic means of the governor causes a trouble to abruptly open the discharge controller, the trouble can be avoided because the low-value selecting circuit can automatically select an output from the load limiter.

Further as the result, the method of the present invention can accomplish the following at a time:

reducing the upstream water pressure rise upon a load rejection reducing the designed water pressures in the upstream penstock and in the pump turbine itself resulting cost reduction reducing the width of the lower water pressure drop upon a load rejection improving the installation height of pump turbines resulting construction cost reduction eliminating mutual water hammer interference among pump turbines sharing an upstream penstock, a downstream penstock or both and reducing the water thrust upon pump turbines resulting rationalization in thrust metal designing and stabilizing the operation of the pump turbine upon a load rejection.

A third embodiment will be explained below referring the accompanying drawings. FIG. 24 is a schematic block diagram of the governor of a pump turbine which is the third embodiment of the present invention.

This block diagram contains a speed detector 1 for detecting the rotational speed N of pump turbines 14α to 14γ, a speed detection signal Xn, a speed controller 302 for setting a reference rotational speed, a set value X0 from the speed controller 302, an adder 303, a restoration signal Xσ coming from the speed control rate setting unit, and a signal Xε output from the adder 303, and a correction control signal X400 from a correction control circuit 400.

A signal X320A obtained by correcting Xε with the correction control signal X400 is fed to the PID operation circuit just under the signal. A proportion element 304a (P element) is used in a normal power generation mode in which a generator motor is connected to a large power system. A proportion element 304b (P element) is used for no-load operation after a load rejection. The gain KPa of the proportion element 304a is greater than the gain KPb of the proportion element 304b. An integration element 305a (I element) is used in a normal power generation mode. An integration element 305b (I element) is used for no-load operation after a load rejection. The gain Kia of the integration element 305a is greater than the gain Kib of the integration element 305b. Contacts 319a and 319b directly or indirectly detect the ON/OFF status of the circuit breaker for the generator motor (which is not visible in FIG. 26). When the circuit breaker opens, the contacts 319a and 319b simultaneously swing to open the lower contact and close the upper contact. Two contacts on each side 319a or 319b are required to switch the P and I elements at the same time.

The differentiation element 306 (D element) outputs a signal Zd. The contact 319b outputs a signal Zp coming from the proportion element and a signal Zi coming from the integration element.

The adder 307 adds these signals. A signal Z is a total of the output of the proportion element Zp, the output of the integration element Zi, and the output of the differentiation element Zd. The signal Z is a vane opening command signal. An actual vane opening is indicated by a signal Y.

The adder 308, the limiter 309, and the oil-pressure servo motor 310 constitute a kind of oil-pressure amplifier. It constitutes a first order lag element with a limiter as a transfer function and amplifies the vane opening signal Z into a vane opening Y which has a stroke and an operating force strong enough to directly operate the guide vanes which works as a discharge controller. A signal Yε1 indicates a difference between a vane opening command signal Z and an actual vane opening Y. The limiter 309 contains θR which limits the vane opening rate to θR.Cy and θL which limits the vane closing speed to θl.Cy. The signal Yε2 is obtained by limiting the difference signal Yε1 considering said vane opening and closing speed limits. A desired vane opening setting signal Yb is output from the output controller 313 to the adder 311. If the actual vane opening Y is smaller than Yb (or Y<Yb), an Open signal σ (Ya−Y) is continuously fed to the PID operation unit until the difference Ya−Y becomes zero. Finally, the actual vane opening Y is equal to the vane opening setting signal Ya and the Open signal σ (Yb−Y) stops. The speed control rate setting block 312 sets the above coefficient σ. In other words, the coefficient σ is a gain which determines the ratio of the change of the vane opening Y to the change of the speed detection signal Xn. In general, it is determined considering the role of the relevant plant in the power system or the rate of load sharing. Once it is determined it will never be changed. The signal 314 indicates the output characteristics of a turbine including a penstock system. The load electric power L of the relevant plant is fed to the generator motor which is directly coupled to the shaft of the turbine. The load electric power RL is supplied from the electric power system. The signal Pg is the load of the generator motor which is the sum of load electric powers L and RL. A load characteristic 317b is given from the electric power system. The self-controlling ability block 317a of the turbines 12α to 12γ is a characteristic block which totals machine losses which increases according to a speed increase, efficiency reduction, and so on. Accordingly, the signal RT indicates a turbine output loss due to the self-control ability accompanied by the change of the rotational speed. Therefore, when viewed from the turbine, RT as well as Pg can be recognized as a kind of load. In other words, their sum can be assumed to be the sum of the loads LΣ=Pg+RT which consume the output Pt of the turbine. The signal (Pt−LΣ) is fed to the inertia effect part 316 of the rotor and the output of the inertia effect part 316 of the rotor becomes the rotational speed N. After a load rejection, the signal P becomes equal to the signal L.

The speed controller 302, the output controller 313, and the speed control rate setting block 312 are functionally the same as those of the first and second embodiments and their explanation will be omitted here.

Figure 27:
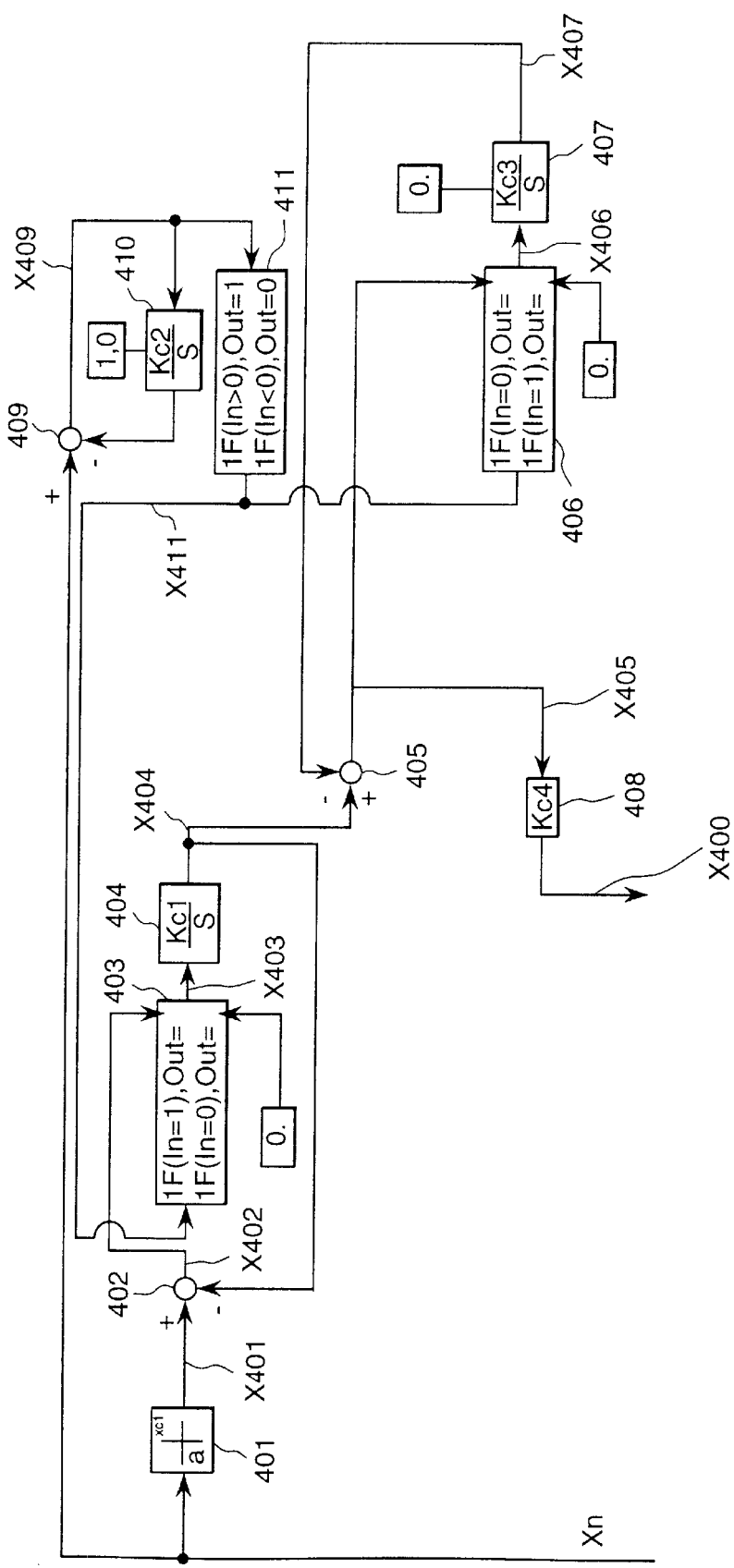
FIG. 27 is a schematic block diagram of the correction circuit.
Figure 28:
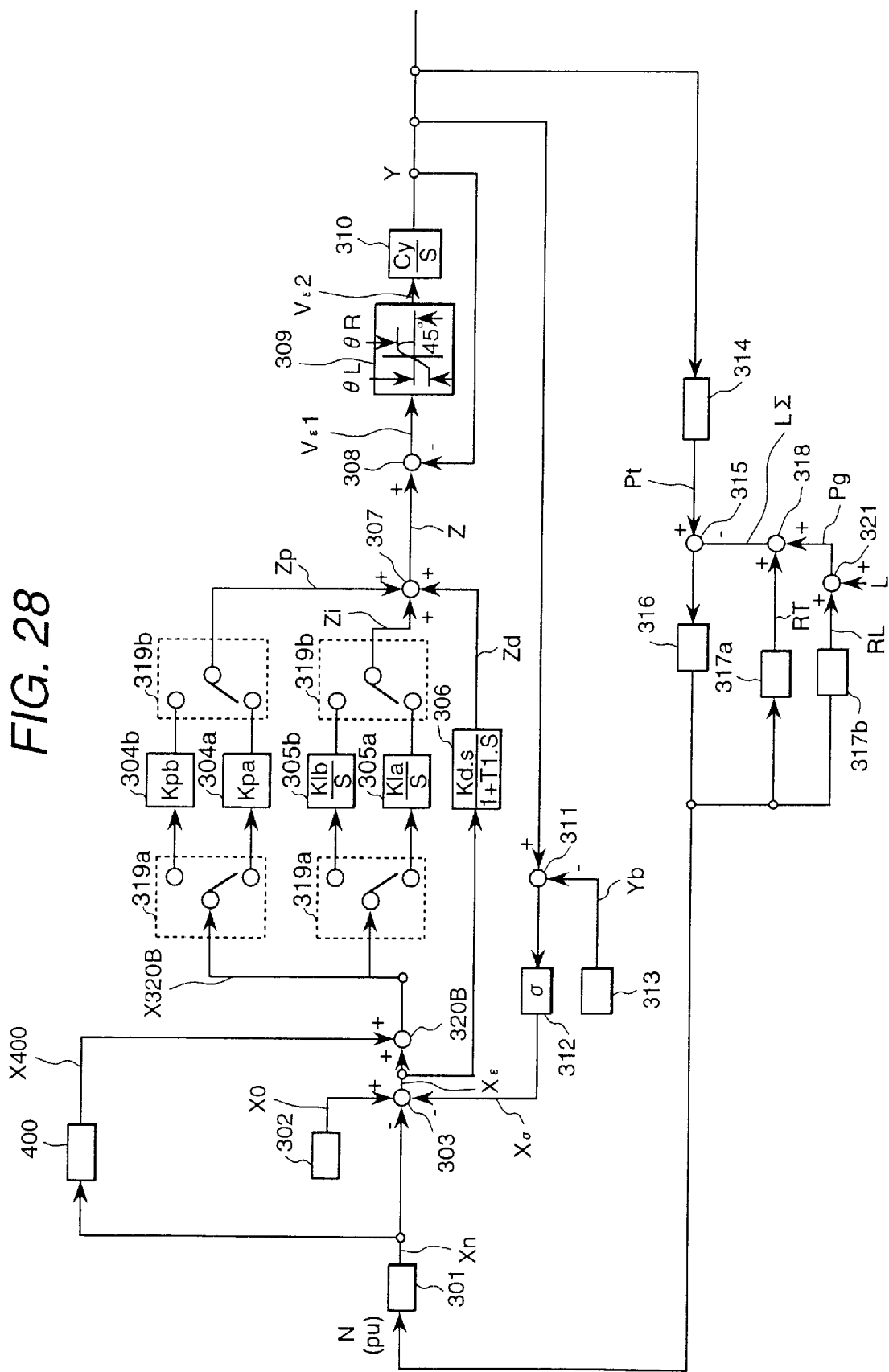
FIG. 28 is a schematic block diagram of a governor which is a third embodiment of the present invention.

FIG. 27 is a schematic block diagram of the correction-control circuit 400 in the governor of FIG. 28.

The correction control circuit 400 contains an adder 409 and an integrator 410. The correction-control circuit receives a speed detection signal Xn and outputs X400. At the start of a load rejection, the integrator 410 has an initial value of 1.0 which is equivalent to the rated rotational speed. The output X409 of the adder 409 is an incomplete differentiation of Xn. You can tell by X409 whether dN/dt is positive (increasing speed) or negative (decreasing speed). A switch circuit 411 outputs 1.0 when X409 is positive and 0 when X409 is negative. A circuit 401 works as a passivity element which passes only Xn which is greater than a preset value Xc1. The value Xc1 should be greater than Xn=0.1 which is equivalent to the rated speed and cannot be obtained in the normal operation in which the generator motor is connected to the electric power system and can be obtained only when a load is rejected.

For example, the value Xc1 to be set is 1.04 to 1.05. A relay element 403 outputs a signal X402 coming from an adder 402 when the output X411 of the switch 411 is positive or a zero when the output X211 of the switch 211 is negative. An integrator 404 receives a signal X403 output from the relay element 403. With these, a response of the signal X404 to the signal X401 is a first order lag response of a time constant 1/Kc1 (gain 1) while the rotational speed is increasing or remains unchanged on a value (which is just before the speed starts to decrease) while the speed is decreasing. The time constant 1/Kc1 is much smaller than a time constant 1/Kc3 (to be explained later). An adder 405 subtracts a signal X407 (to be explained later) from the signal X404 and produces a signal X405. A relay element 406 outputs a signal X405 coming from the adder 405 when the output X411 of the switch 411 is negative or a zero when the output X411 of the switch 411 is positive. An integrator 407 receives a signal X406 coming from the relay element 406.

With these, a response of the signal X405 to the signal X404 is an incomplete differentiation which slowly decreases the signal X404 exponentially while the speed is decreasing. Its time constant is 1/Kc3 and the gain is 1 (incomplete differentiation).

On the other hand, as the value of the signal X404 increases while the speed is increasing and the signal X407 retains a value just before the speed starts to increase, the value of the signal X405 increases. In other words, the value of the signal X205 increases as the speed is increasing and slowly decreases exponentially when the speed starts to decrease. This is equivalent to the speed change model curve upon a load rejection.

Figure 26:
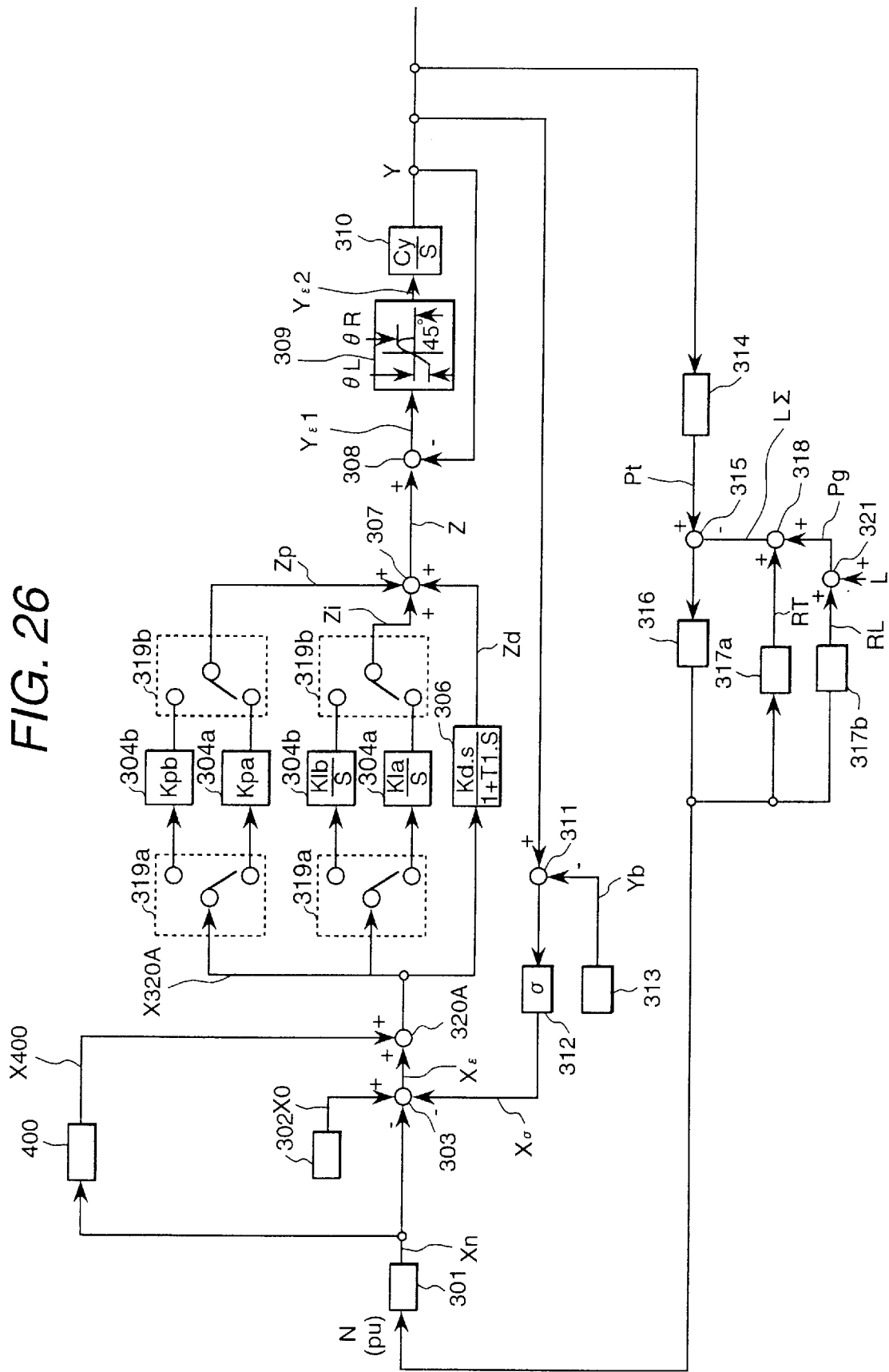
FIG. 26 is a schematic block diagram of a correction-control circuit which is another embodiment of the present invention.

FIG. 28 is a schematic block diagram of a correction circuit which is a modification of the circuit of FIG. 26.

The differentiation element 306 (D element) inputs Xε. The input X320B of the PI operation circuit is obtained by correcting the signal Xε by the correction-control signal X200. Namely, the correction-control circuit directly has influences only upon the proportion element (P element) and the integration element (I element). The other circuit configuration is the same as that of FIG. 26. Their details are omitted here.

Figure 29:
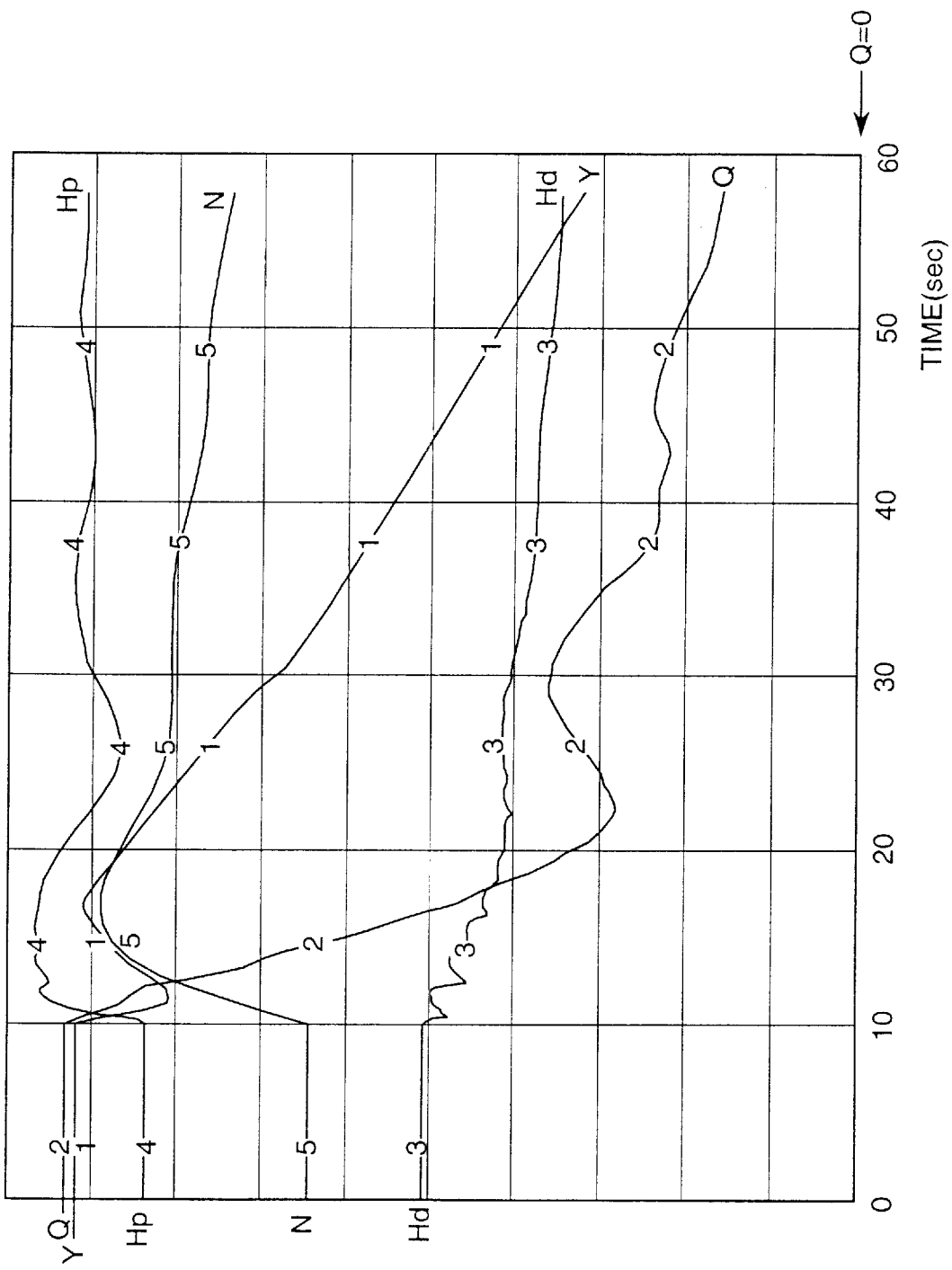
FIG. 29 is a chart showing transient conditions of the pump turbine upon load rejection according to the present invention.

FIG. 29 shows a time response of a pump turbine which employs the above embodiments of FIG. 28 and FIG. 27 upon a load rejection. FIG. 29 shows transitions of the vane opening Y, the rotational speed N, the discharge Q, the inlet water pressure Hp of the turbine, and the outlet water pressure Hp of the turbine upon a load rejection.

Figure 31:
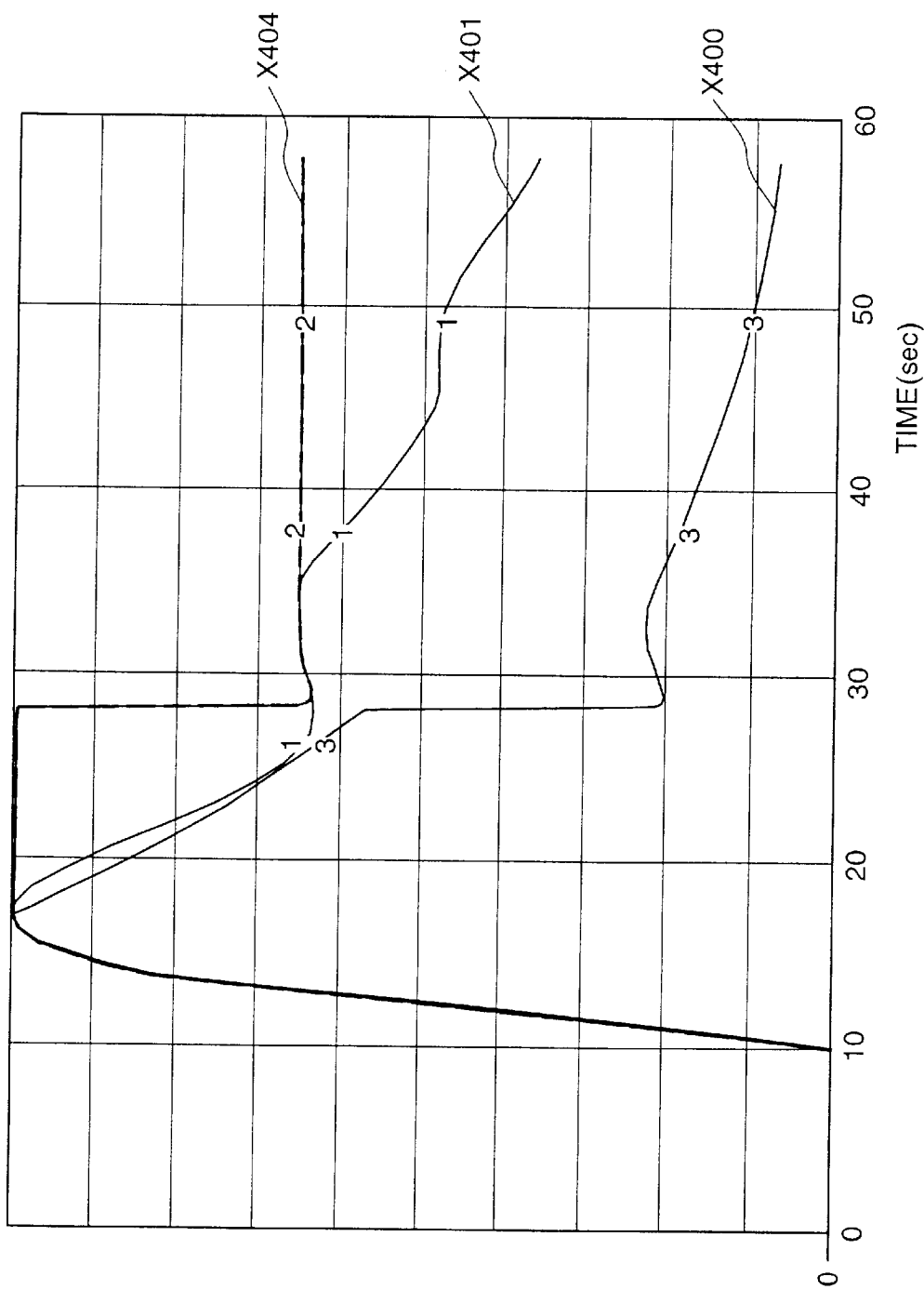
FIG. 31 is a graph explaining responses of the correction circuit.
Figure 32:
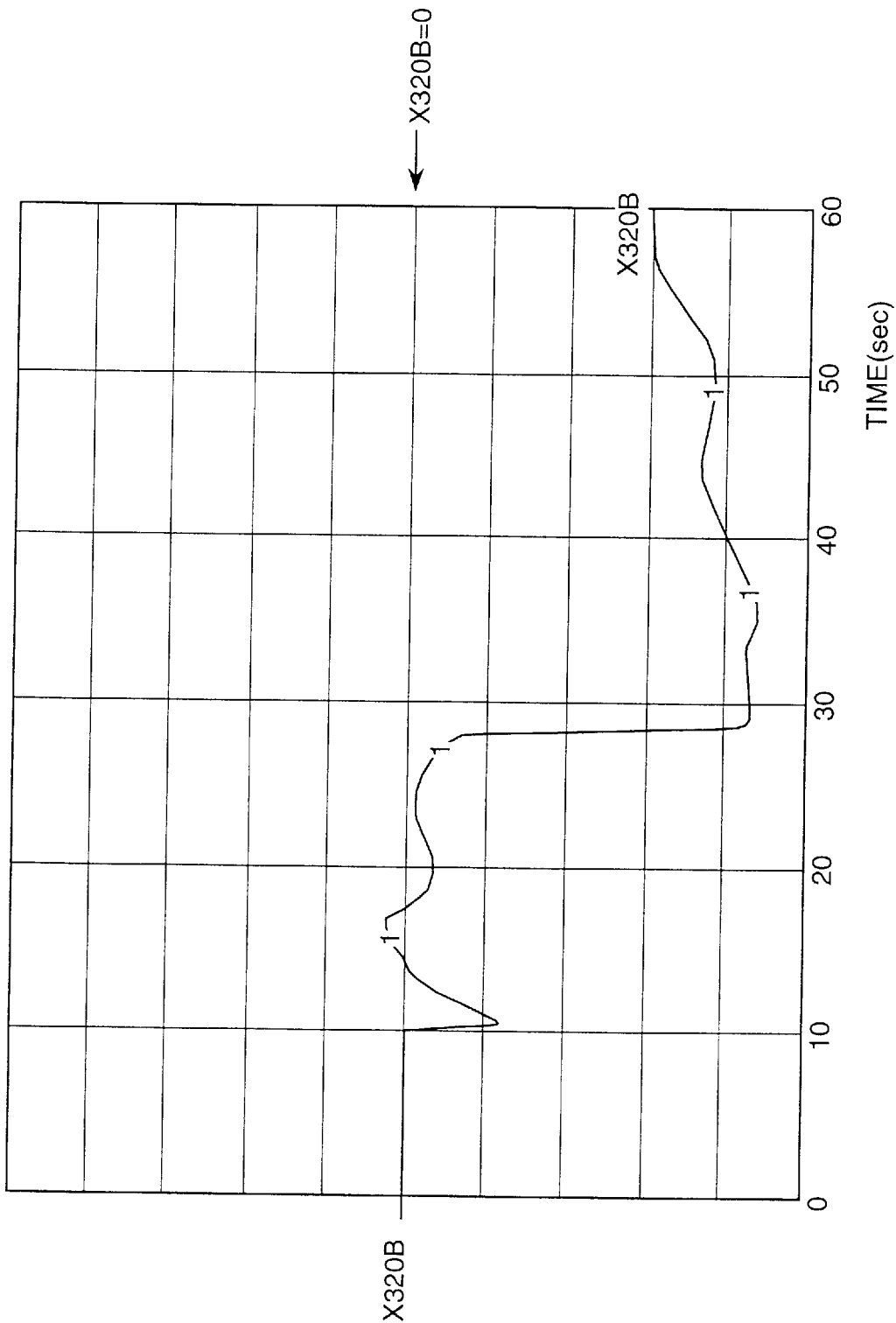
FIG. 32 is a graph explaining responses of the correction circuit.

When the speed after a load rejection starts to increase, the governor starts to quickly close the guide vanes in response to it. When the speed increases and the speed detection signal Xn exceeds a predetermined value Xc1, a signal X401 is fed to the correction-control circuit 400. The correction-control circuit starts to work and outputs a correction-control signal X400. As the preset value X0 from the speed controller 302 is corrected by the correction-control signal X400, the vane closing rate is gradually decreased and finally the guide vanes turn to open. FIG. 31 shows the behavior of signals X401, X404, and X400 in the correction-control circuit 400. Further, FIG. 32 shows the behavior of a signal X320B entered to the proportion element (P element) and to the integration element (I element) after the above correction.

Namely, the embodiment of FIG. 28 is designed so that the correction signal X400 may not have any influence directly on the differentiation element 306 (D element). This is to cause the differentiation element 306 to answer to the speed fluctuation as faithfully as possible.

Figure 33:
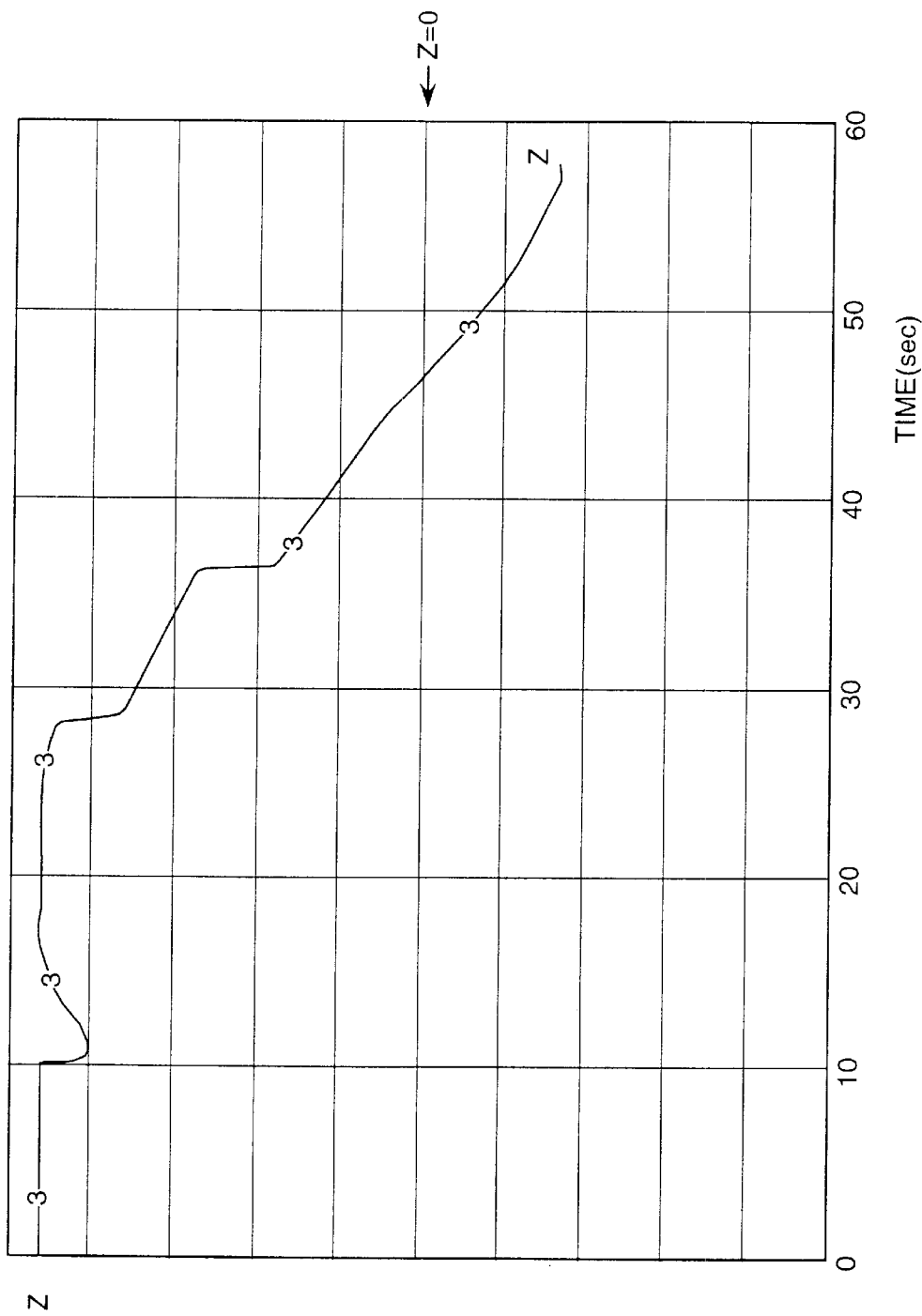
FIG. 33 is a graph indicating responses of the correction circuit.

The adder 307 adds the output Zp of the proportion element (P element) 304b which is a response to the signal X320B, the output Zi of the integration element (I element) 305b which is a response to the signal X320B, and the output Zd of the differentiation element (D element) 306 which is a response to the signal Xε output from the adder 303 and outputs a vane opening command signal Z of FIG. 33. As the result, the guide vanes smoothly turns to open after fast closing as seen from FIG. 29 and continues opening until the speed reaches the peak. of course, during this time period, the vane opening is gradually decelerated as the speed increasing rate reduces by the governor control.

Figure 30:
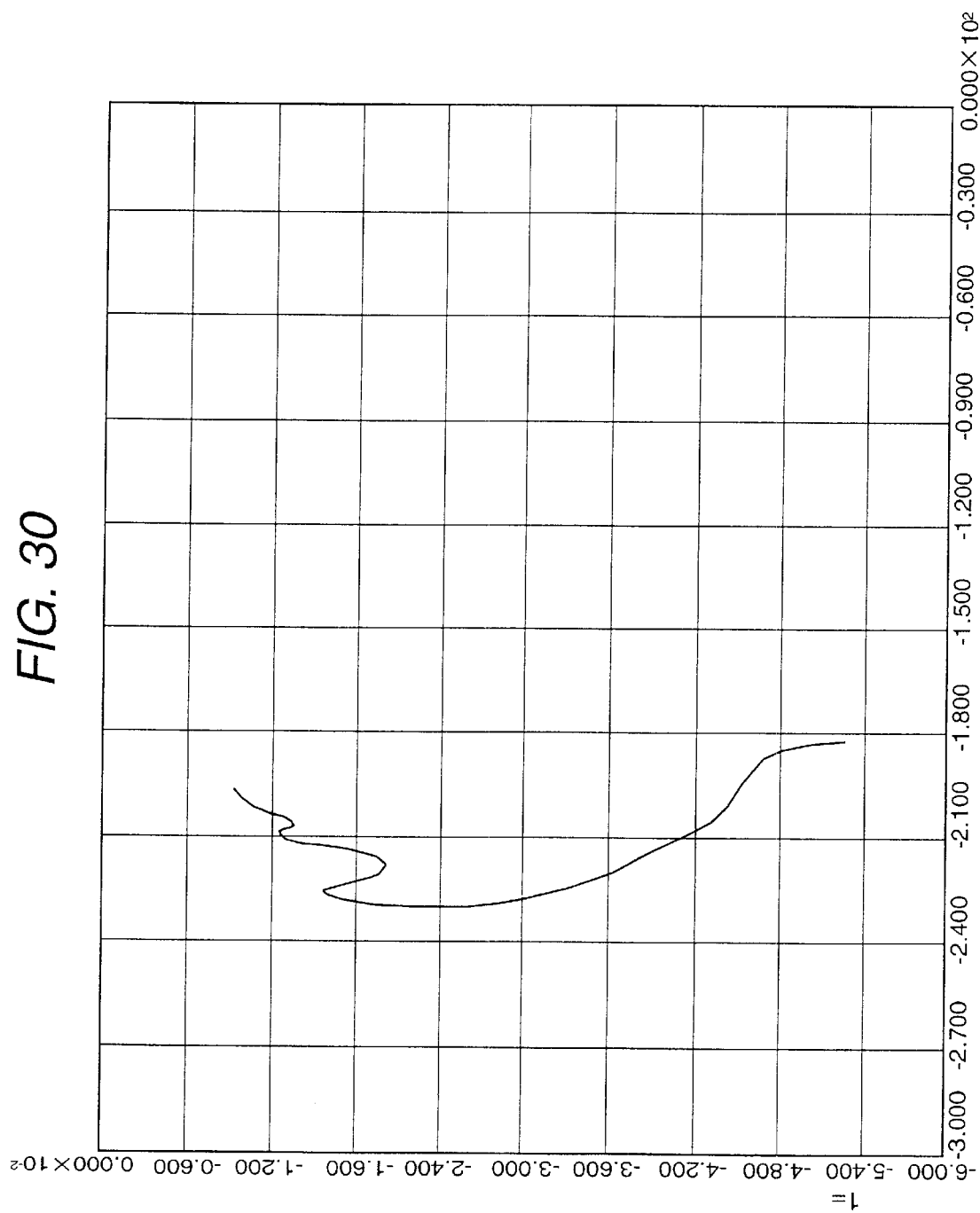
FIG. 30 is a graph showing a trajectory of the operation point of the pump turbine upon load rejection according to the invention.

The discharge reduction rate of the turbine becomes fully low before the speed reached the peak by opening of the guide vanes, that is, before the running point enters the S-characteristics region. FIG. 30 shows the locus of the running point of the pump turbine after a load rejection. This outlines the smooth convergence of the running point to a no-load running point over a peak of the S-characteristics curve (at which the N1 value is the greatest) at each time point, that is, along an almost non-restricted (NR) speed curve. Although this example shows a little fluctuation, the curve may be smoother when the stability of the governor is increased.

In other words, when the discharge decrease rate is made fully low before the running point enters the S-characteristics region and if the stability of the governor is responded timely at this time point, the ideal discharge decrease curve will be expected.

In this case, it is because the set value of the speed controller is corrected to a momentary high value that the stability of the governor is responded in spite of a high rotational speed.

The upstream penstock water pressure can go lower if the increase range of the first fast vane closing is made greater. However, this is not so effective in cost reduction. It is most effective to reduce the maximum water pressure by making the curve almost flat after that as seen in FIG. 29.

Figure 11:
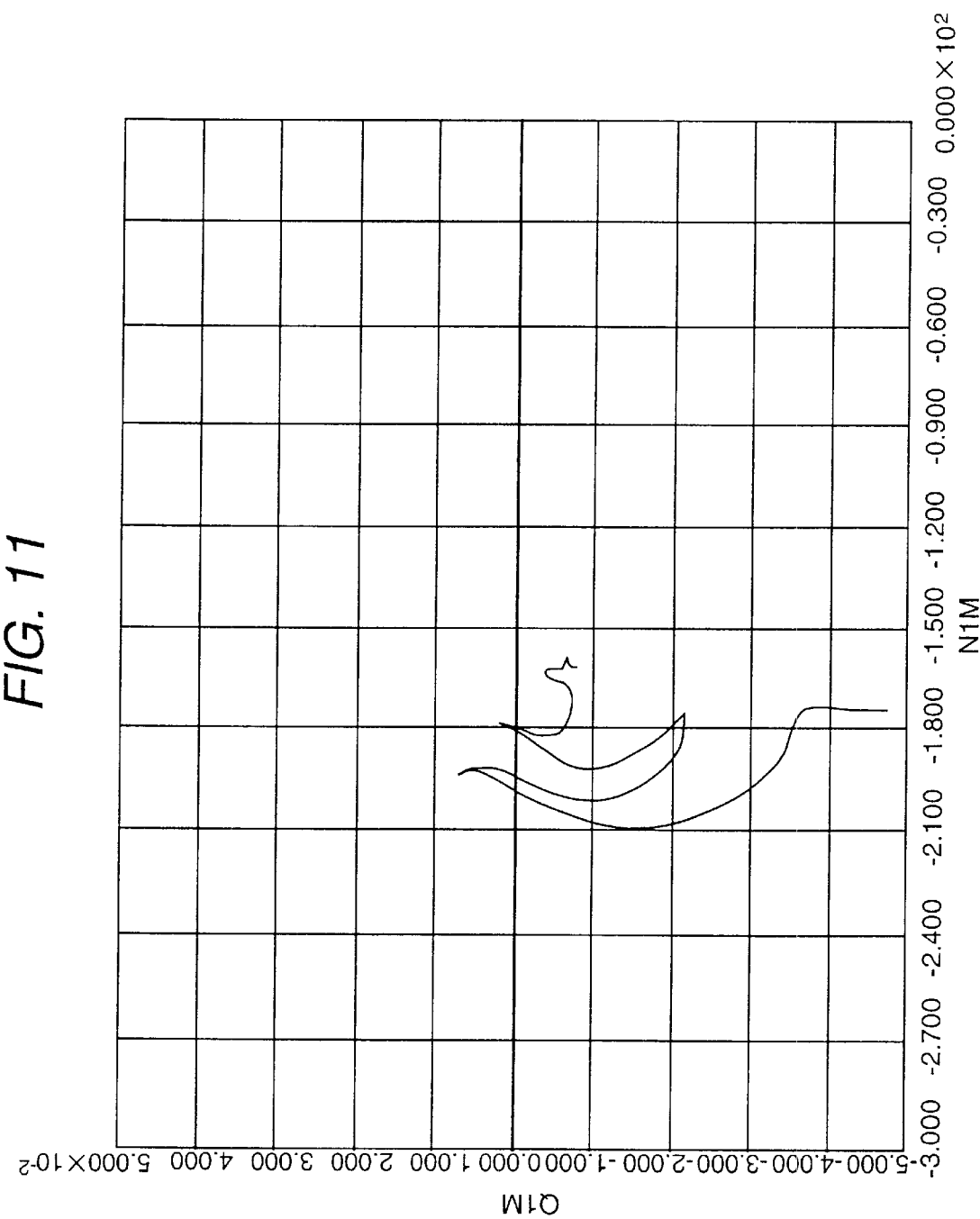
FIG. 11 is a graph explaining a trajectory of the operation point of the pump turbine upon load rejection according to the conventional control.

The effect of this embodiment will be clearer when compared by those of FIG. 10 and FIG. 11. FIG. 10 and FIG. 11 show the transient phenomenon of each of three pump turbines sharing an upstream penstock upon sequential load rejections, assuming that their channels are a little different. Under this condition, you can find the water discharge violently reverses its direction temporarily and the second water hammering generates.

Further, you can also find other influences due to the S-characteristics such as violent fluctuations in outlet water pressures and rotational speed.

When the present invention is applied to a 700-meter penstock pumping-up power plant, the maximum upstream penstock water pressure can be greatly reduced down to about 7.5 MPa (conventionally about 8.5 MPa) and the outlet water drop width can be reduced by a few ten meters.

In case of emergency stop (which is not visible in FIG. 26 and FIG. 28), the guide vanes are quickly closed with $Y\epsilon 1$ unconditionally retained under $-\theta L$. The almost end of convergence of the operation in the S-characteristics region can be recognized by the reduction of the speed under a predetermined value or the opening of the guide vanes under a predetermined value.

From the above description, the effect of the present invention is apparent. In other words, the discharge is reduced extremely smoothly after a load rejection as shown in FIG. 29. Accordingly, the width of the upstream water pressure rise can be minimized.

Therefore, it is possible to drastically reduce the designed water pressure in the upstream penstock and the pump turbine itself. It is also possible to drastically reduce the water pressure drop width due to the S-characteristics phenomenon in the downstream penstock of the turbine. Particularly, it is possible to eliminate abnormal spikes by a mutual hammering interference among pump turbines which share a downstream penstock. Therefore, the pump turbines can be installed on higher locations over the water level of an identical lower reservoir, which leads to reduction in the quantity of soil to be dug and the resulting construction cost (in case of an underground power station). Further, as the method of the present invention can drastically reduce the width of an abnormal discharge fluctuation due to the S-characteristics phenomenon, the transient water thrust fluctuation upon the pump turbine can be reduced greatly. This enables rationalized designing of the thrust bearings. Conventionally, to suppress abnormal mutual hammer interference among pump turbines sharing an up- or downstream penstock, the operation of each of the pump turbines must be limited in some cases. However, the present invention can free the pump turbines from such limitations. Further, the method of the present invention can suppress an excessive flow fluctuation upon a load rejection. This can reduce vibrations, noises, and so on, improves the running status of the pump turbines, and prolongs their service lives. It is needless to say that the effects of the present invention all contribute to the reduction of cost in building a pump-up power plant. The effects of the present invention can also be realized at an extremely low cost just by adding a correction-control circuit to the governor or temporarily adjusting preset values. Particularly, for a microprocessor type governor which can load operation programs from the outside, the effects of the present invention can be attained just by updating the operation programs.

Furthermore, this embodiment can drastically reduce the upstream water pressure rise upon a load rejection. This enables reduction of the designed water pressures in the upstream penstock and the pump turbine itself, consequently leading to reduction of costs in pressure-tight designing. Further, as the effect of the present invention can reduce the range of a downstream water pressure drop upon a load rejection, the pump turbines can be installed on shallower locations, which leads to reduction the quantity of soil to be dug and the resulting construction cost.

Further, the effect of the present invention can suppress a detrimental mutual hammer interference among pump turbines which share an upstream or downstream penstock. Consequently, the conventional operational limitations on the pump turbines can be abolished.

The effect of the present invention can suppress a discharge fluctuation upon a load rejection, which enables rational designing of thrust metal which can eliminate water thrust in the transient status.

The effect of the present invention can make the operation of pump turbines stable upon a load rejection.

In FIG. 11, the running point of a pump turbine after a load rejection always rushes into the S-characteristics region, which may be caused by too much acceleration of the discharge reduction rate before the running point moves along the first area of the N1–Q1 curve towards the lower Q1 value with the N1 value increasing and reaches the end of the area. Therefore, it may be too late to open the guide vanes to reduce the vibration due to the S-characteristics (as disclosed in Japanese Non-examined Patent Publication S53-143842 (1988)) after or immediately before the running point rushes into the S-characteristics region. To prevent this, it is necessary to turn the closing guide vanes to open at optimum timing to reduce the discharge decrease rate by correction-controlling the governor or automatically and temporarily adjusting the preset values of the governor from the beginning of the speed increase. While the rotational speed is increasing, opening the guide vanes increases the discharge under the same operating conditions N1. Accordingly, a sign opposite to that of the discharge reduction due to the increase of N is effective for suppression. As the discharge reduction is accelerated during the speed increase, it is preferable to keep on opening the guide vanes in synchronism with this acceleration.

Usually, the guide vanes work to close just after a load rejection and then to open. However, the opening of the guide vanes should be as small as possible just before the rotational speed reaches the peak or before the running point rushes into the S-characteristics region. This is because the S-characteristics phenomenon has less influence as the opening of the guide vanes becomes smaller. Therefore, the quick vane closing immediately after a load rejection is always required.

The above-mentioned ingenious guide vane control is to finally smoothen the discharge reduction. It is preferable that the guide vanes smoothly turn from quick closing (after a load rejection) to opening.

If the discharge reduction is fully decelerated when the rotational speed reaches the peak, the running point cannot go further into the S-characteristics region even when it is in the region. In other words, by correcting the target rotational speed of the governor to a higher value at a proper timing while the speed is increasing after a load rejection, the governor tries to keep the corrected speed and control the guide vanes even when the speed remains high near the peak. This is because it can cancel the influence due to the S-characteristics phenomenon. In other words, if the rotational speed is apt to be pulled down quickly by the S-characteristics, the guide vanes open and this dynamically lessens the influence due to the S-characteristics.

When controlled properly, the governor works to gradually reduce the rotational speed and gradually close the guide vanes with the running point kept near at the entrance of the S-characteristics region. This suppression effect upon the S-characteristics will decelerated the speed decreasing rate. Therefore, you can know the effect of the anti-S-characteristics control from the speed curve. Experimentally, you can assume that the effect of the anti-S-characteristics control appears if a time period between the first peak and the reach of the speed to one third of the sum of the speed before the load rejection plus the difference between the first peak and the speed before the load rejection is 1.5 times or above a time period required by the speed to the peak after a load rejection.

As explained above, while the effect of the anti-S-characteristics control appears and the speed decreases slowly, the above temporary speed increase correction of the governor should be canceled gradually.

It is also effective to prevent the running point from rushing into the S-characteristics region by continuing the temporary vane opening even immediately after the running point enters the S-characteristics region.

There is another method of turning the guide vanes from closing to opening while the rotational speed is still increasing after a load rejection.

When the governor is a PID governor equipped with proportion, integration, and differentiation elements, it can be attained by temporarily lowering the gain of the proportion element, the gain of the integration element, or both.

When the governor is a damping type governor including an incomplete differentiation element in the restoration circuit, the above gain reduction (P and I gains) can be substituted by increasing the damping gain and the time constant.

This governor value switching should be carried out smoothly without bumps because a jumping of the guide vanes in the anti-S-characteristics control may cause an extraordinary mutual hammer interference among pump turbines sharing a penstock.

In the above description, the speed of governor's response in the usual loaded operation is the highest. The speed of governor's response in the no-load steady operation is the next. And the speed of governor's response just after a load rejection is the lowest.

There can be a method of using only the speed of governor's response just after a load rejection without switching between the speed of governor's response in the no-load steady operation and the speed of governor's response just after a load rejection. However, this makes the speed reduction too slow in the trailing half (considering the transient phenomenon upon a load rejection) and keeps the pump turbine and the generator motor running at high speeds. A pump turbine which is slow to recover the rotational speed after a load rejection is operationally inconvenient and takes too much time in reconnecting the pump turbine to the power system.

A method of switching from a setting just after a load rejection to a setting for a no-load steady operation is triggered when the guide vanes is closed to a preset opening or below or when the rotational speed goes below a predetermined value.

One of the most rational methods of reducing the upstream penstock water pressure comprises steps of controlling the guide vanes to smoothly turns from quick closing to opening and retaining the upstream penstock water pressure which has risen during quick closing of the guide vanes after a load rejection at about the same value until the speed reaches the peak value as a counterbalance of the water pressure increasing effect due to the increase of the rotational speed and the water pressure decreasing effect due to the vane opening operation.

In the above, a method of increasing a target rotational speed of the governor and a method of reducing the integral and proportional gains of the arithmetic means are described as methods of opening the closing guide vanes at a proper timing while the speed is increasing immediately after a load rejection. Of course, these methods can be combined.

Naturally, the aforesaid anti-S-characteristics control should be so designed as to work only upon a load rejection accompanied by a speed rise or in case of emergency stop. Therefore, as a possible method, the anti-S-characteristics control should be triggered when the rotational speed exceeds a predetermined value which the normal operation will not reach.

This method can convergence the discharge very smoothly to a no-load discharge (or zero discharge) without causing any agitation even in a pump turbine having the S-characteristics such as overshoots and reverse flows due to the S-characteristics phenomenon after a load rejection (or after an emergency stop command signal is given). Judging from the locus of the running point on the N1–Q1 plane after a load rejection, the method can move the running point along the NR line (non-restricted speed line) until the discharge becomes stable on the no-load discharge level without entering the running point into the S-characteristics region. As the result, the second water hammering due to the S-characteristics disappears. Therefore, the first water hammering can be reduced freely and consequently water hammering can be minimized. In other words, as for the upstream penstock water pressure, a rational method of controlling the penstock water pressure to a minimum level is to control the governor so that the guide vanes may be smoothly turned from quick closing to opening at an almost identical water pressure level until the water pressure rise by the quick closing of the guide vanes stops at the speed peak.

As this method can reduce water hammering to a minimum level, this method has a great effect in reducing the designed water pressure in the upstream penstock and the pump-up height of the pump turbine. Particularly, the reduction in the pump-up height leads to installation of pump turbines on shallower locations, which leads to reduction in the quantity of soil to be dug and the resulting construction cost (in case of an underground power station).

Further, the avoidance of the anti-S-characteristics and elimination of second water hammerings lead to elimination of abnormal mutual hammer interference in up- and downstream penstocks upon sequential load rejections. Therefore, only water hammering upon full load rejections can be discussed.

Further, this method can minimize the discharge fluctuation after a load rejection (or when an emergency stop command signal is given), lessens excessive vibrations, and also minimizes the transient water thrust upon pump turbines. This method also improves the transient running status of the pump turbines, which makes the system quieter and more stable.

The method in accordance with the present invention is characterized that the anti-S-characteristics control bringing the above effects can be accomplished just by modifying the logics of the arithmetic means in the governor. In other words, the system improving cost is extremely small.

Further, the anti-S-characteristics control can be installed without interfering the natural governor control, assuring the safety and reliability of the system.

Although the guide vanes temporarily open after a load rejection (or when an emergency stop command signal is given) and the speed rise width may increase, the speed rise width can be suppressed down to a few % due to the merit of the S-characteristics. In other words, this merit is that the rotational speed will not go over an N1 value at the peak of the S-characteristics curve of the guide vanes, that is, the rotational speed will not go over a value equivalent to the N1 value at the junction of the first and second areas.

What we claim is:

1. A method of controlling a pump turbine, comprising steps of controlling the quantity of water passing through a runner connected to a generator motor, changing the rotational direction of said runner so that said runner can work in a Pump-up mode or in the Power Generation mode, and controlling the quantity of water so that, when a load of said generator motor is rejected in the Power Generation mode, the rotational speed of the runner may turn to increase at a speed which is higher than the rated rotational speed or the initial speed at least one third of the difference between the first peak and the rated rotational speed or the initial speed after the first speed increase upon a load rejection turns to a speed decrease.

2. A method of controlling a pump turbine in accordance with claim 1, further comprising steps of controlling said quantity of water by a discharge controller and temporarily opening said discharge controller in the leading half of the speed decreasing stage after the first speed increase upon a load rejection turns to a speed decrease.

3. A method of controlling a pump turbine in accordance with claim 1, further comprising steps of putting said discharge controller under control of a rotational speed governor after a load rejection which has at least two sets of settings selectable, one for higher stability which is to be used at earlier stage of the transient period after a load rejection and the other for higher response speed which is to be used at later stage of the transient period after load rejection.

4. A method of controlling a pump turbine in accordance with claim 3, further comprising a step of automatically switching said setting of said rotational speed governor when said discharge controller closes under a predetermined opening after a load rejection.

5. A method of controlling a pump turbine in accordance with claim 3, further comprising a step of automatically switching said setting of said rotational speed governor when the rotational speed goes below a predetermined value after a load rejection.

6. A method of controlling a pump turbine in accordance with claim 3, further comprising a step of switching said setting of said rotational speed governor so that the response speed in the normal loaded operation, the response speed in the no-load steady state operation, and the response speed at earlier stage of the transient period after a load rejection are made slower in that order.

7. A method of controlling a pump turbine in accordance with claim 3, wherein said changing of said setting is made without bumps.

8. A method of controlling a pump turbine in accordance with claim 3, wherein said rotational speed governor contains proportion, integration, and differentiation elements and said integration elements are switched with said proportion and differentiation elements retained constant.

9. A method of controlling a pump turbine in accordance with claim 1, further comprising steps of controlling said quantity of water by a discharge controller, limiting the rate of closing said discharge controller according to the opening of said discharge controller, limiting the closing rate of said discharge controller to a second predetermined value or below which is comparatively high while the opening of said discharge controller is over a first predetermined value, limiting the closing rate of said discharge controller to a third predetermined value or below which is comparatively low when the opening of said discharge controller is under a first predetermined value, and preventing said closing discharge controller from opening until said discharge controller is closed to said first predetermined opening immediately after a load rejection.

10. A method of controlling a pump turbine in accordance with claim 1, further comprising steps of starting said temporary opening operation after the rotational speed turns to decrease over said first peak after a load rejection and continuing said opening operation until the rotational speed reaches an inflection point where the rotational speed curve changes from a convex curve to a concave curve.

11. A method of controlling a pump turbine in accordance with claim 1, further comprising steps of putting said discharge controller under control of a speed control governor after a load rejection which is adjusted so that said discharge controller is started to open a little earlier than a time point at which the speed rise after a load rejection stops.

12. A method of controlling a pump turbine in accordance with claim 11, further comprising steps of controlling said quantity of continuing said opening operation to a point (inflection point) where the rotational speed curve changes from a convex curve to a concave curve.

13. A method of controlling a pump turbine in accordance with claim 3, wherein said setting is automatically switched from a response priority setting for a loaded operation to an anti-S-characteristics control setting for improved stability when said rotational speed exceeds a predetermined value which is higher than the rated rotational speed.

14. A method of controlling a pump turbine comprising steps of controlling a discharge controller for adjusting the quantity of water passing through a runner which transmits a torque to a generator motor, changing the rotational direction of said runner to pump up or generate power temporarily opening said discharge controller, just before the first rotational speed peak or in the leading half of the first speed decrease curve, putting said discharge controller under control of a rotational speed governor after a load rejection which adjusts its settings according to operation stage so that, when the rated power or near power of said generator motor is rejected, a time period between the first rotational speed peak and return of the rotational speed to the normal may be over twice as much as a time period between the start of the speed rise and the first rotational speed peak.

15. A method of controlling a pump turbine comprising steps of controlling the quantity of water passing through a runner which is coupled to a generator motor, changing the rotational direction of said runner to run the pump turbine in the Pump-up mode or Power Generation mode, closing said discharge controller immediately after the speed rise upon a load rejection which shuts off the power output in the Power Generation mode or in case of emergency stop, turning said discharge controller to open in the leading half of the speed rise, continuing said opening operation approximately until the speed reaches a peak, stopping the opening operation there, and closing the discharge controller.

16. A method of controlling a pump turbine in accordance with claim 15, wherein said closing discharge controller is temporarily opened in the leading half of the first speed decrease after the first speed rise upon a load rejection turns to a speed decrease over the first peak.

17. A method of controlling a pump turbine comprising steps of controlling the quantity of water passing through a runner which is coupled to a generator motor, changing the rotational direction of said runner to run the pump turbine in the Pump-up mode or Power Generation mode, closing said discharge controller immediately after the speed rise upon a load rejection which shuts off the power output in the Power Generation mode or in case of emergency stop, gradually reducing the closing rate of said discharge controller in the leading half of the speed rise, turning said discharge controller to open, continuing said opening operation approximately until the speed reaches a peak, gradually decelerating said opening operation, and thus resuming closing of the discharge controller.

18. A method of controlling a pump turbine comprising steps of controlling the quantity of water passing through a runner which is coupled to a generator motor, changing the rotational direction of said runner to run the pump turbine in the Pump-up mode or Power Generation mode, closing said discharge controller immediately after the speed rise upon a load rejection which shuts off the power output in the Power Generation mode or in case of emergency stop, wherein said discharge controller which is closing is temporarily opened in the leading half of the first speed decrease after the first speed increase upon a full load rejection turns to the first speed decrease over a first peak.

19. A method of controlling a pump turbine comprising steps of controlling the quantity of water passing through a runner which is coupled to a generator motor, changing the rotational direction of said runner to run the pump turbine in the Pump-up mode or Power Generation mode, closing said discharge controller immediately after the speed rise upon a load rejection which shuts off the power output in the Power Generation mode or in case of emergency stop, turning said discharge controller to open in the leading half of the speed rise, continuing said opening operation until the speed reaches a peak, stopping the opening operation there, and closing the discharge controller; wherein, upon a full load rejection or almost full load rejection, a time period between said first peak and the instant for the rotational speed to return as much as two thirds of the difference between the initial speed before the load rejection and said first peak is over 1.5 times as much as a time period between the load rejection point and the first speed peak.

20. A method of controlling a pump turbine comprising steps of controlling the quantity of water passing through a runner which is coupled to a generator motor, changing the rotational direction of said runner to run the pump turbine in the Pump-up mode or Power Generation mode, closing said discharge controller immediately after the speed rise upon a load rejection which shuts off the power output in the Power Generation mode or in case of emergency stop, gradually decelerating the closing rate of said discharge controller to turn said discharge controller to open in the leading half of the speed rise, continuing said opening operation until the speed reaches a peak, gradually decelerating the opening operation, and closing the discharge controller; wherein, upon a full load rejection or almost full load rejection, a time period between said first peak and the instant for the rotational speed to return as much as two thirds of the difference between the initial speed before the load rejection and said first peak is over 1.5 times as much as a time period between the load rejection point and the first speed peak.

21. A method of controlling a pump turbine comprising steps of controlling the quantity of water passing through a runner which is coupled to a generator motor, changing the rotational direction of said runner to run the pump turbine in the Pump-up mode or Power Generation mode, closing said discharge controller immediately after the speed rise upon a load rejection which shuts off the power output in the Power Generation mode or in case of emergency stop, turning said discharge controller to open in the leading half of the speed rise; wherein, upon a full load rejection or almost full load rejection, a time period between said first peak and the instant for the rotational speed to return as much as two thirds of the difference between the initial speed before the load rejection and said first peak is over 1.5 times as much as a time period between the load rejection point and the first speed peak.

22. A method of controlling a pump turbine in accordance with claim 15, further comprising steps of turning said closing discharge controller to open, continuing said opening operation immediately after the speed reaches a peak, stopping said opening operation, and resuming closing of the discharge controller.

23. A method of controlling a pump turbine in accordance with claim 15, further comprising steps of putting said discharge controller under control of a speed control governor after a load rejection, and temporarily adjusting or switching settings of said governor while the speed is still increasing after a load rejection to turn said closing discharge controller to open.

24. A method of controlling a pump turbine in accordance with claim 16, further comprising a step of putting said discharge controller under control of a speed control governor after a load rejection, and temporarily adjusting or switching settings of said governor while the speed is still increasing after a load rejection to turn said closing discharge controller to open.

25. A method of controlling a pump turbine in accordance with claim 23, further comprising steps of temporarily increasing a command value of said governor immediately when a load is rejected or when an emergency stop command signal is given.

26. A method of controlling a pump turbine in accordance with claim 23, wherein a target speed in a transient status immediately after a load rejection is controlled to be substantially higher than a target value in the steady status.

27. A method of controlling a pump turbine in accordance with claim 26, further comprising steps of correcting to increase the target speed as the speed increases immediately after a load rejection, gradually releasing said target speed correction after the speed decrease starts, and completely releasing said correction control in the steady status.

28. A method of controlling a pump turbine in accordance with claim 15, further comprising a step of controlling said closing discharge controller to smoothly open so that the upstream penstock water pressure which increased while said discharge controller was closing immediately after a load rejection may be retained at an approximately identical value until the rotational speed reaches a peak value.

29. A method of controlling a pump turbine in accordance with claim 20, further comprising a step of controlling said closing discharge controller to smoothly open so that the upstream penstock water pressure which increased while said discharge controller was closing immediately after a load rejection may be retained at an approximately identical value until the rotational speed reaches a peak value.

30. A method of controlling a pump turbine in accordance with claim 23, wherein said governor contains proportional, integral, and differential elements and gain of at least one of said proportional and integral elements is temporarily reduced while the speed increases after a load rejection to turn said closing discharge controller to open.

31. A method of controlling a pump turbine in accordance with claim 23, wherein said governor settings are automatically switched so that response speed of said governor in the normal loaded operation, response speed of said governor in the no-load steady operation, and response speed of said governor in the first speed increase just after a load rejection may be made smaller in that order.

32. A method of controlling a pump turbine in accordance with claim 23, wherein settings of said governor are automatically switched from a response priority setting for a loaded operation to a stability priority setting when said speed exceeds a predetermined value higher than a rated speed.

33. A method of controlling a pump turbine in accordance with claim 23, wherein said governor settings are automatically switched from a setting to temporarily open said discharge controller to a setting for a no-load steady operation when said discharge controller is closed to a predetermined opening after a load rejection.

34. A method of controlling a pump turbine in accordance with claim 23, wherein said governor settings are automatically switched from a setting to extract said temporarily opening to a setting for a no-load steady operation when the speed goes below a predetermined value after a load rejection.

35. A method of controlling a pump turbine in accordance with claim 31, further comprising steps of temporarily increasing the target runner speed immediately after a load is rejected or an emergency stop command signal is given.

36. A method of controlling a pump turbine, comprising steps of controlling the quantity of water passing through a runner which is coupled to a generator motor by a discharge controller, changing the rotational direction of said runner to pump up or generate power, and temporarily opening the discharge controller when the power generated by the generator motor is shut off in the Power Generation mode.

37. A method of controlling a pump turbine, comprising steps of controlling the quantity of water passing through a runner which is coupled to a generator motor by a discharge controller, changing the rotational direction of said runner to pump up or generate power, and temporarily opening the discharge controller at least once before the runner speed reaches a point at which the speed decreasing rate is accelerated over the first peak when the power generated by the generator motor is shut off in the Power Generation mode.

38. A method of controlling a pump turbine in accordance with claim 36, wherein said temporary opening of said discharge controller is performed so as not to cause a transient reverse flow after a load rejection.

39. A method of controlling a pump turbine in accordance with claim 37, wherein said temporary opening of said discharge controller is performed so as not to cause a transient reverse flow after a load rejection.

40. A method of controlling a pump turbine in accordance with claim 36, wherein said temporary opening of said discharge controller is controlled so that the rate of the runner speed decrease may be smaller than the rate of the runner speed increase rate after a load rejection.

41. A method of controlling a pump turbine in accordance with claim 37, wherein said temporary opening of said discharge controller is controlled so as not to cause a transient reverse flow after a load rejection.

42. A method of controlling a pump turbine in accordance with claim 36, wherein said temporary opening of said discharge controller is controlled to eliminate a second water hammering peak in the upstream side of the pump turbine immediately after the runner speed turns to decrease upon a load rejection.

43. A method of controlling a pump turbine in accordance with claim 37, wherein said temporary opening of said discharge controller is controlled to eliminate a second water hammering peak in the upstream side of the pump turbine immediately after the runner speed turns to decrease upon a load rejection.

44. A method of controlling a pump turbine in accordance with claim 36, wherein said discharge controller is temporarily opened by switching, changing, or modifying transfer functions of a rotational speed governor for said pump turbine in the transient status after a load rejection.

45. A method of controlling a pump turbine in accordance with claim 37, wherein said discharge controller is temporarily opened by switching, changing, or modifying transfer functions of a rotational governor for said pump turbine in the transient status after a load rejection.

46. A method of controlling a pump turbine in accordance with claim 36, wherein the high opening limit of said discharge controller is substantially limited by an independent limiter which is closed in a predetermined pattern after a load rejection.

47. A method of controlling a pump turbine in accordance with claim 37, wherein the high opening limit of said discharge controller is substantially limited by an independent limiter which is closed in a predetermined pattern after a load.

* * * * *